(12) United States Patent
Sobue et al.

(10) Patent No.: US 9,598,106 B2
(45) Date of Patent: Mar. 21, 2017

(54) PARKING ASSISTANCE DEVICE

(75) Inventors: Yuka Sobue, Nagoya (JP); Ryuji Okamura, Toyota (JP); Chika Morimoto, Toyota (JP); Yu Hiei, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/978,263

(22) PCT Filed: Aug. 12, 2011

(86) PCT No.: PCT/JP2011/068479
§ 371 (c)(1),
(2), (4) Date: Jul. 3, 2013

(87) PCT Pub. No.: WO2013/024523
PCT Pub. Date: Feb. 21, 2013

(65) Prior Publication Data
US 2014/0148971 A1    May 29, 2014

(51) Int. Cl.
| | | |
|---|---|---|
| G05D 1/00 | (2006.01) |
| G05D 3/00 | (2006.01) |
| G06F 7/00 | (2006.01) |
| G06F 17/00 | (2006.01) |
| B62D 15/02 | (2006.01) |

(52) U.S. Cl.
CPC .............................. B62D 15/0275 (2013.01)

(58) Field of Classification Search
USPC ............................................ 701/1; 340/932.2
See application file for complete search history.

(56) References Cited

U.S. PATENT DOCUMENTS

| | | | |
|---|---|---|---|
| 6,463,363 B1 | 10/2002 | Okuda | |
| 2006/0190147 A1* | 8/2006 | Lee ..................... | B62D 15/0275 701/26 |
| 2007/0057816 A1* | 3/2007 | Sakakibara ........ | B62D 15/0275 340/932.2 |
| 2008/0158011 A1 | 7/2008 | Yamanaka | |
| 2009/0091475 A1* | 4/2009 | Watanabe .............. | B60Q 9/005 340/932.2 |
| 2010/0013670 A1* | 1/2010 | Hueppauff ........... | B62D 15/028 340/932.2 |
| 2010/0049402 A1 | 2/2010 | Tanaka | |
| 2010/0070139 A1* | 3/2010 | Ohshima ................... | B60R 1/00 701/42 |
| 2011/0095910 A1 | 4/2011 | Takano | |

FOREIGN PATENT DOCUMENTS

| | | |
|---|---|---|
| CN | 1819944 A | 8/2006 |
| CN | 101228059 A | 7/2008 |
| JP | A-2000-339598 | 12/2000 |

(Continued)

*Primary Examiner* — Imran Mustafa
(74) *Attorney, Agent, or Firm* — Oliff PLC

(57) ABSTRACT

When a host vehicle moves forward, a drawing arithmetic unit and a display of an ECU which display the image of the surroundings of the host vehicle display a trajectory when the host vehicle moves forward from the current position at the current steering angle and trajectories when the host vehicle is reversed from the current position at a steering angle different from the current steering angle so as to be superimposed on a bird's-eye image.

9 Claims, 24 Drawing Sheets

(56) References Cited

FOREIGN PATENT DOCUMENTS

| | | |
|---|---|---|
| JP | A-2001-213253 | 8/2001 |
| JP | A-2004-25942 | 1/2004 |
| JP | A-2004-284370 | 10/2004 |
| JP | 2006-160147 A | 6/2006 |
| JP | A-2006-248383 | 9/2006 |
| JP | 2008-284969 A | 11/2008 |
| JP | 2009-083680 A | 4/2009 |
| JP | 2009-220682 A | 10/2009 |
| JP | A-2011-42356 | 3/2011 |
| JP | A-2011-138386 | 7/2011 |
| WO | WO 2009/151053 A1 | 12/2009 |

\* cited by examiner

PARKING ASSISTANCE DEVICE

An embodiment of the invention relates to a parking assistance device that displays the trajectory of a host vehicle.

BACKGROUND ART

A device has been proposed which displays the image of the surroundings of the host vehicle or the trajectory of the host vehicle to assist the driving of the driver when the driver parks the vehicle in the parking area. For example, Patent Literature 1 discloses a device which displays an estimated guidance trajectory when the vehicle is reversed with the steering angle fixed to a maximum value. The device disclosed in Patent Literature 1 displays peripheral information acquired by a sensor and the position of the host vehicle on a display screen. The device disclosed in Patent Literature 1 displays a guidance trajectory integrally with the symbol of the host vehicle on the screen such that the point where the guidance trajectory is accommodated in a parking space is a reverse starting position. In addition, the device disclosed in Patent Literature 1 also displays an estimated trajectory whose shape is changed depending on the actual steering angle of the steering wheel such that the estimated trajectory overlaps the guidance trajectory, thereby guiding a steering operation.

CITATION LIST

Patent Literature

[Patent Literature 1] Japanese Unexamined Patent Application Publication No. 2001-213253

SUMMARY OF INVENTION

Technical Problem

However, in general, when the vehicle is parked in the parking area, the angel formed between the direction of the traveling path in the parking lot and the front-rear direction of the parking area is a predetermined value such as 90°. Therefore, first, the vehicle moves forward while turning to reduce the angle between the front-rear direction of the vehicle and the front-rear direction of the parking area. Then, the vehicle is reversed while turning in the reverse direction to be parked in the parking area.

As such, when the vehicle moves forward while turning and is then reversed while turning in the reverse direction, the body of the vehicle passes along different trajectories when the vehicle moves forward and when the vehicle is reversed. However, in the above-mentioned technique, when the vehicle moves forward, only the trajectory obtained when the vehicle is reversed with the steering angle fixed to the maximum value is displayed. Therefore, when there is an obstacle around the vehicle during parking, it is difficult for the driver to check whether the vehicle can move forward without contacting the obstacle and whether the vehicle can be reversed without contacting the obstacle at the same time.

An embodiment of the invention is made in view of the above-mentioned problems and an object thereof is to provide a parking assistance device capable of performing appropriate parking assistance when the host vehicle approaches obstacles.

Solution to Problem

According to an embodiment of the invention, a parking assistance device includes a display unit that displays an image of the surroundings of a host vehicle. When the host vehicle moves forward, the display unit displays a first trajectory when the host vehicle moves forward from a current position at a current steering angle and a second trajectory when the host vehicle is reversed from the current position at a steering angle different from the current steering angle so as to be superimposed on the image of the surroundings of the host vehicle.

According to this structure, when the host vehicle moves forward, the display unit that displays the image of the surroundings of the host vehicle displays the first trajectory when the host vehicle moves forward from the current position at the current steering angle and the second trajectory when the host vehicle is reversed from the current position at the steering angle different from the current steering angle so as to be superimposed on the image of the surroundings of the host vehicle. Therefore, for example, when the host vehicle moves forward while turning and then is reversed while turning in the reverse direction to be parked in a parking area, the driver of the host vehicle can check the trajectory of the host vehicle during forward movement and the trajectory of the host vehicle during reverse at the same time. Therefore, it is easy for the driver of the host vehicle to drive the host vehicle forward to the reverse start position where the host vehicle does not contact a neighboring obstacle during reverse. As a result, it is possible to perform appropriate parking assistance when the host vehicle approaches obstacles.

In this case, when the host vehicle moves forward, the display unit may display the first trajectory and a range of the second trajectory obtained when the host vehicle is reversed from the current position at each steering angle in a predetermined range different from the current steering angle so as to be superimposed on the image of the surroundings of the host vehicle.

According to this structure, the display unit displays the first trajectory and the range of the second trajectory obtained when the host vehicle is reversed from the current position at each steering angle in the predetermined range different from the current steering angle so as to be superimposed on the image of the surroundings of the host vehicle. Therefore, the driver of the host vehicle has a high degree of flexibility in selecting the reverse start position during forward movement.

In this case, when the host vehicle is reversed after the first trajectory and the range of the second trajectory are displayed during the forward movement of the host vehicle, the display unit may display a third trajectory obtained when the host vehicle is reversed at a steering angle so as to be superimposed on the image of the surroundings of the host vehicle.

According to this structure, when the host vehicle is reversed after the first trajectory and the range of the second trajectory are displayed during the forward movement of the host vehicle, the display unit displays the third trajectory obtained when the host vehicle is reversed at a steering angle so as to be superimposed on the image of the surroundings of the host vehicle. Therefore, the driver of the host vehicle determines the reverse start position on the basis of the first trajectory and the range of the second trajectory during forward movement and parks the host vehicle in the parking area with ease on the basis of the third trajectory when starting to reverse the vehicle.

The range of the second trajectory may be a range of a trajectory of a front end of the host vehicle when the host vehicle is reversed from the current position at each steering angle in the predetermined range different from the current steering angle.

According to this structure, the range of the second trajectory may be the range of the trajectory of the front end of the host vehicle when the host vehicle is reversed from the current position at each steering angle in the predetermined range different from the current steering angle. Therefore, the driver of the host vehicle has a high degree of flexibility in selecting the reverse start position during forward movement and it is easy for the driver to check the possibility that the front end, which is likely to contact obstacles and to be treated with disregard when movement changes from forward movement to reverse, will contact the obstacles.

The display unit may display the first trajectory and the second trajectory so as to be superimposed on an image of a front portion of the host vehicle.

According to this structure, the display unit can display the first trajectory and the second trajectory so as to be superimposed on the image of the front portion of the host vehicle. Therefore, for example, when the host vehicle moves forward while turning and is then reversed while turning in the reverse direction to be parked in the parking area, it is easy for the driver of the host vehicle to check an obstacle which is likely to contact the front portion of the host vehicle when the host vehicle moves forward and is then reversed.

The display unit may display the first trajectory and the second trajectory so as to be superimposed on a bird's-eye image of the host vehicle.

According to this structure, the display unit can display the first trajectory and the second trajectory so as to be superimposed on a bird's-eye image of the host vehicle. Therefore, it is easy for the driver of the host vehicle to check the trajectory of the host vehicle and obstacles around the host vehicle when movement changes between forward movement and reverse.

Advantageous Effects of Invention

According to an embodiment of the invention, it is possible to perform appropriate parking assistance when the host vehicle approaches obstacles.

DESCRIPTION OF EMBODIMENTS

Figure 1:
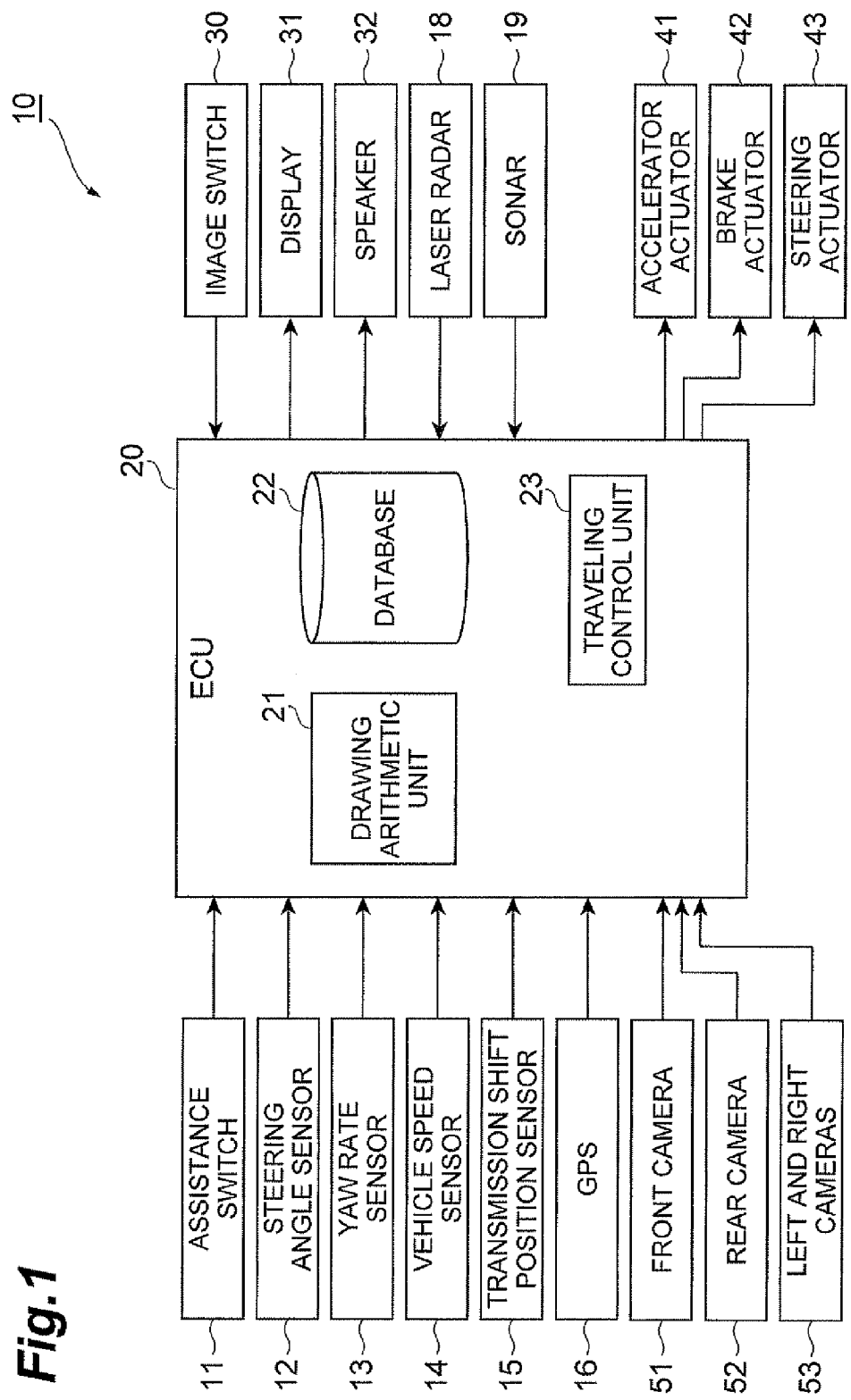
FIG. 1 is a block diagram illustrating the structure of a parking assistance device according to an embodiment.

Hereinafter, a parking assistance device according to an embodiment of the invention will be described with reference to the accompanying drawings. A parking assistance device 10 according to this embodiment includes an assistance switch 11, a steering angle sensor 12, a yaw rate sensor 13, a vehicle speed sensor 14, a transmission shift position sensor 15, a GPS 16, a laser radar 18, a sonar 19, an ECU 20, an image switch 30, a display 31, a speaker 32, an accelerator actuator 41, a brake actuator 42, a steering actuator 43, a front camera 51, a rear camera 52, and left and right cameras 53.

The assistance switch 11 is used to display the image of the surroundings of the host vehicle which is captured by the front camera 51, the rear camera 52, and the left and right cameras 53 on the display 31 in response to an operation of the driver. In this embodiment, when the host vehicle moves forward or is reversed after the driver turns on the assistance switch 11, a traveling trajectory or a traveling trajectory region is displayed on the display 31 so as to be superimposed on the image of the surroundings of the host vehicle, the image of a front portion of the host vehicle, or the image of a rear portion of the host vehicle, which will be described below.

The steering angle sensor 12 detects a steering angle which is the angle of the front tires with respect to the front-rear direction of the host vehicle. The yaw rate sensor 13 detects the yaw rate of the host vehicle using, for example, a gyro sensor. The vehicle speed sensor 14 detects the rotational speed of the wheels of the host vehicle to detect the speed of the host vehicle. The transmission shift position sensor 15 detects whether the transmission of the host vehicle is shifted to drive "D" or reverse "R".

The GPS (Global Positioning System) 16 receives signals from, for example, a GPS satellite to measure the position of the host vehicle. In this embodiment, the GPS 16 is not indispensable.

In this embodiment, the laser radar 18 and the sonar 19 are not indispensable and are used to detect, for example, obstacles around the host vehicle or a parking area.

The ECU (Electronic Control Unit) 20 controls the overall operation of the host vehicle. The ECU 20 includes a drawing arithmetic unit 21, a database 22, and a traveling control unit 23. The drawing arithmetic unit 21 draws a traveling trajectory region when the host vehicle moves forward or is reversed so as to be superimposed on the image of the surroundings of the host vehicle, the image of the front portion of the host vehicle, or the image of the rear portion of the host vehicle, on the basis of signals from the assistance switch 11, the steering angle sensor 12, the yaw rate sensor 13, the vehicle speed sensor 14, the transmission shift position sensor 15, the GPS 16, the laser radar 18, the sonar 19, the image switch 30, the front camera 51, the rear camera 52, and the left and right cameras 53 and information stored in the database 22.

The database 22 stores information about the turning characteristics of the host vehicle, such as a turning radius, and the dimensions of the host vehicle, such as a total length, a total width, and a total height. In addition, the database stores information about a parking area, such as the angle formed between the direction of a traveling path and the front-rear direction of the parking area, for each parking lot.

The traveling control unit 23 is not indispensable in this embodiment and drives the accelerator actuator 41, the brake 42, and the steering actuator 43 to intervene in the driving operation of the driver, thereby performing parking assistance, on the basis of the signals from the assistance switch 11, the steering angle sensor 12, the yaw rate sensor 13, the vehicle speed sensor 14, the transmission shift position sensor 15, the GPS 16, the laser radar 18, the sonar 19, the front camera 51, the rear camera 52, and the left and right cameras 53 and the information stored in the database 22.

The image switch 30 switches the bird's-eye image of the surroundings of the entire host vehicle and the image displayed on the display 31 between the bird's-eye image of the front portion of the host vehicle and the image of the rear portion of the host vehicle, which will be described below. The display 31 displays the bird's-eye image of the surroundings of the entire host vehicle, the bird's-eye image of the front portion of the host vehicle, and the image of the rear portion of the host vehicle which are captured by the front camera 51, the rear camera 52, and the left and right cameras 53. In addition, the display 31 displays the traveling trajectory (the trajectory of the front wheels of the host vehicle, the trajectory of the rear wheels of the host vehicle, the trajectory of the front bumper at the front end of the host vehicle, and the trajectory of the rear bumper at the rear end of the host vehicle) when the host vehicle moves forward or is reversed, or the range of the traveling trajectory so as to be superimposed on the bird's-eye image of the surroundings of the entire host vehicle, the bird's-eye image of the front portion of the host vehicle, and the image of the rear portion of the host vehicle. The display 22 may be, for example, an independent liquid crystal display for parking assistance. Alternatively, the display 22 may also be used as a display for a navigation system. The speaker 32 outputs a sound to provide parking assistance to the driver.

In this embodiment, the accelerator actuator 41, the brake 42, and the steering actuator 43 are not indispensable and operate the accelerator, the brake, and the steering wheel to intervene in the driving operation of the driver in response to command signals from the traveling control unit 23 of the ECU 20, respectively. Alternatively, the accelerator actuator 41, the brake 42, and the steering actuator 43 may give reaction force or tactile sensation based on haptic technology to the accelerator pedal, the brake pedal, and the steering wheel to intervene in the driving operation of the driver, respectively.

The front camera 51 captures the image of the front side of the host vehicle. The front camera 51 can capture the image of the front portion of the host vehicle and the image of the surroundings thereof. The rear camera 52 captures the image of the rear side of the host vehicle. The rear camera 52 can capture the image of the rear portion of the host vehicle and the image of the surroundings thereof. The left and right cameras 53 capture the images of the left and right sides of the host vehicle. The left and right cameras 53 can capture the images of the left and right portions of the host vehicle and the image of the surroundings thereof. The front camera 51, the rear camera 52, and the left and right cameras 53 function as an around-view monitor. The images captured by the front camera 51, the rear camera 52, and the left and right cameras 53 are processed by the drawing arithmetic unit 21 and the display 31 displays the bird's-eye image of the entire host vehicle and the bird's-eye image of the surroundings of the host vehicle, which will be described below. In addition, the display 31 displays the bird's-eye image of the front portion of the host vehicle and the bird's-eye image of the surroundings of the front portion.

Figure 2:
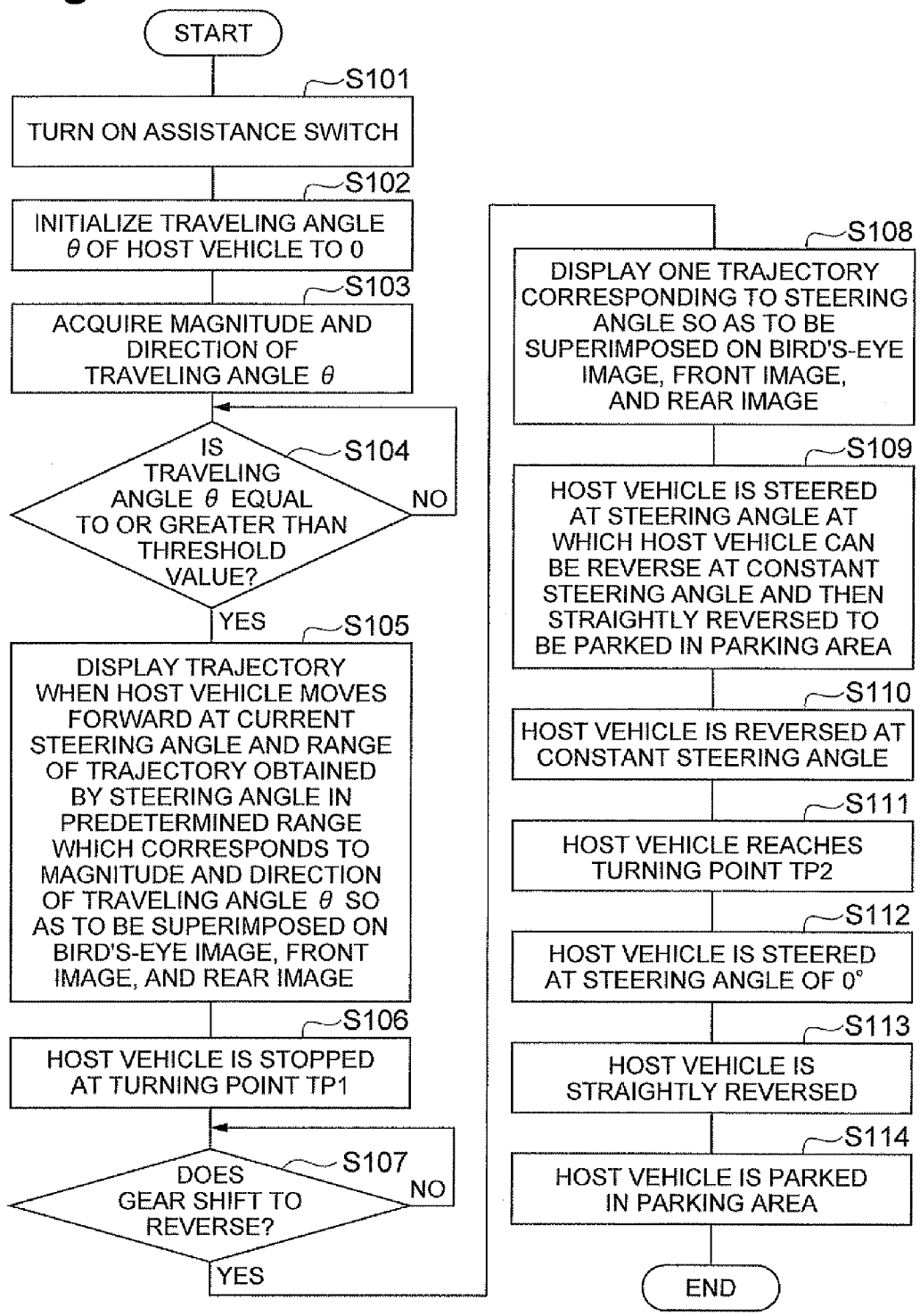
FIG. 2 is a flowchart illustrating the operation of the parking assistance device according to the embodiment.
Figure 3:
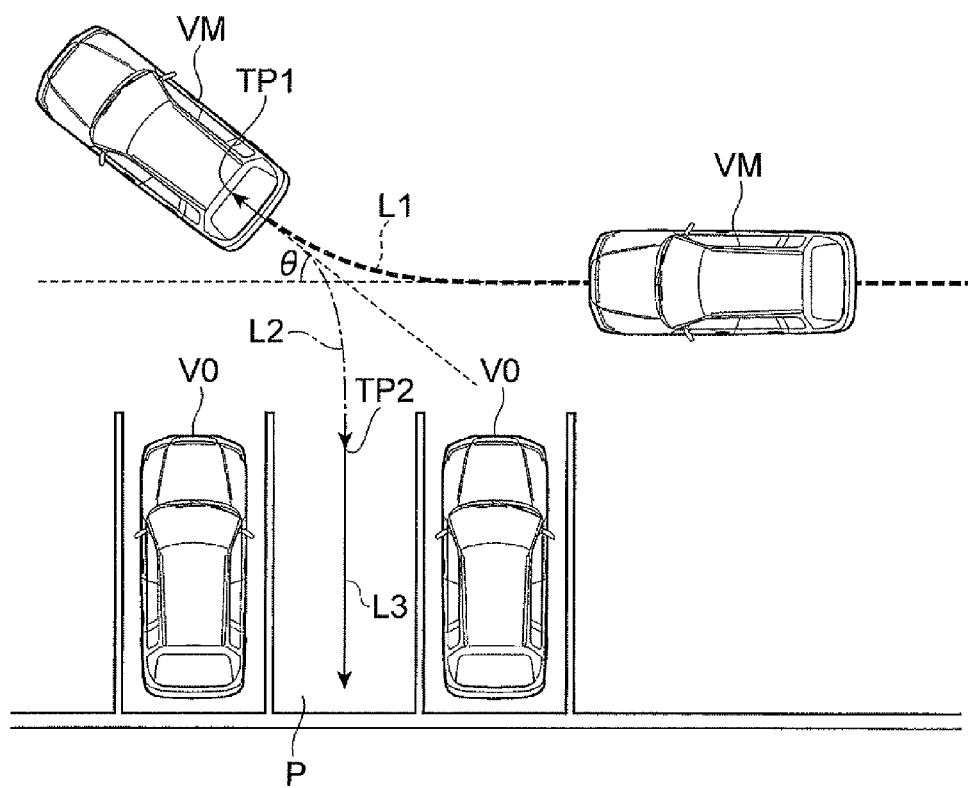
FIG. 3 is a plan view illustrating a series of operations and trajectories when a vehicle provided with the parking assistance device according to the embodiment is parked in a parking area.

Next, the operation of the parking assistance device 10 according to this embodiment will be described. First, the outline of the operation will be described with reference to FIGS. 2 and 3. As shown in FIG. 3, it is assumed that a host vehicle VM provided with the parking assistance device 10 according to this embodiment travels along a traveling path in the parking lot. In the example shown in FIG. 3, the angle formed between the direction of the traveling path in the parking lot and the front-rear direction of the parking area P is 90° and another vehicle VO is parked. As shown in FIG. 2, the driver of the host vehicle VM turns on the assistance switch 11 (S101). In this case, the bird's-eye image of the entire host vehicle VM and the bird's-eye image of the front portion of the host vehicle VM or the image of the rear portion of the host vehicle VM captured by the front camera 51, the rear camera 52, and the left and right cameras 53 are displayed on the display 31.

The driver operates the vehicle while viewing the image displayed on the display 31 as follows. The host vehicle VM moves forward to pass through a trajectory L1 while turning such that a traveling angle θ, which is an angle with respect to the direction of the traveling path in the parking lot, increases, in order to reduce the angle formed between the front-rear direction of the parking area P and the front-rear direction of the host vehicle VM. In this case, the trajectory L1 varies depending on the operation of the driver and the host vehicle VM passes through the trajectory L1 with various traveling angles θ. In this case, the drawing arithmetic unit 21 of the parking assistance device 10 performs the following process (S102 to S104) and displays the trajectory when the host vehicle moves forward at the current steering angle and the trajectory when the host vehicle VM is reversed at a constant steering angle regardless of the steering angle of the host vehicle VM or the range of the trajectory when the host vehicle VM is reversed at a constant steering angle in a predetermined range on the display 31 so as to be superimposed on the bird's-eye image of the entire host vehicle VM, the bird's-eye image of the front portion of the host vehicle VM, and the image of the rear portion of the host vehicle VM which are captured by the front camera 51, the rear camera 52, and the left and right cameras 53 (S105). At that time, the trajectory when the host vehicle VM is reversed at the constant steering angle or the range of the trajectory when the host vehicle VM is reversed at the constant steering angle in the predetermined range includes the trajectory of the rear wheels of the host vehicle VM and the trajectory of the front wheels of the host vehicle VM or the trajectory of the front bumper of the host vehicle VM.

The driver operates the vehicle while viewing the image displayed on the display 31 such that the host vehicle VM reaches a turning point TP1 and is stopped at the turning point TP1 (S106). In this case, when the transmission shift position sensor 15 detects that the transmission is shifted to reverse "R" (S107), the drawing arithmetic unit 21 of the parking assistance device 10 displays one kind of trajectory L2 corresponding to the steering angle of the host vehicle VM at that time and a trajectory L3 parallel to the front-rear direction of the parking area P on the display 31 so as to be superimposed on the bird's-eye image of the entire host vehicle VM, the bird's-eye image of the front portion of the host vehicle VM, and the image of the rear portion of the host vehicle VM (S108).

The driver operates the vehicle while viewing the image displayed on the display 31 such that the steering angle of the host vehicle VM is adjusted to a value at which the host vehicle VM can be reversed at a constant steering angle and then straightly reversed to be parked in the parking area P (S109). The host vehicle VM is reversed in a direction opposite to the trajectory L1 while turning at a constant steering angle and passes through the trajectory L2 (S110). When (the rear wheel or the rear end) of the host vehicle VM reaches a turning point TP2 (S111), the driver adjusts the steering angle of the host vehicle VM to 0° while viewing the image displayed on the display 31 (S112). The host vehicle VM is reversed at a steering angle of 0° (S113) and passes through the trajectory L3. Finally, the host vehicle VM is parked in the parking area P (S114).

Figure 4:
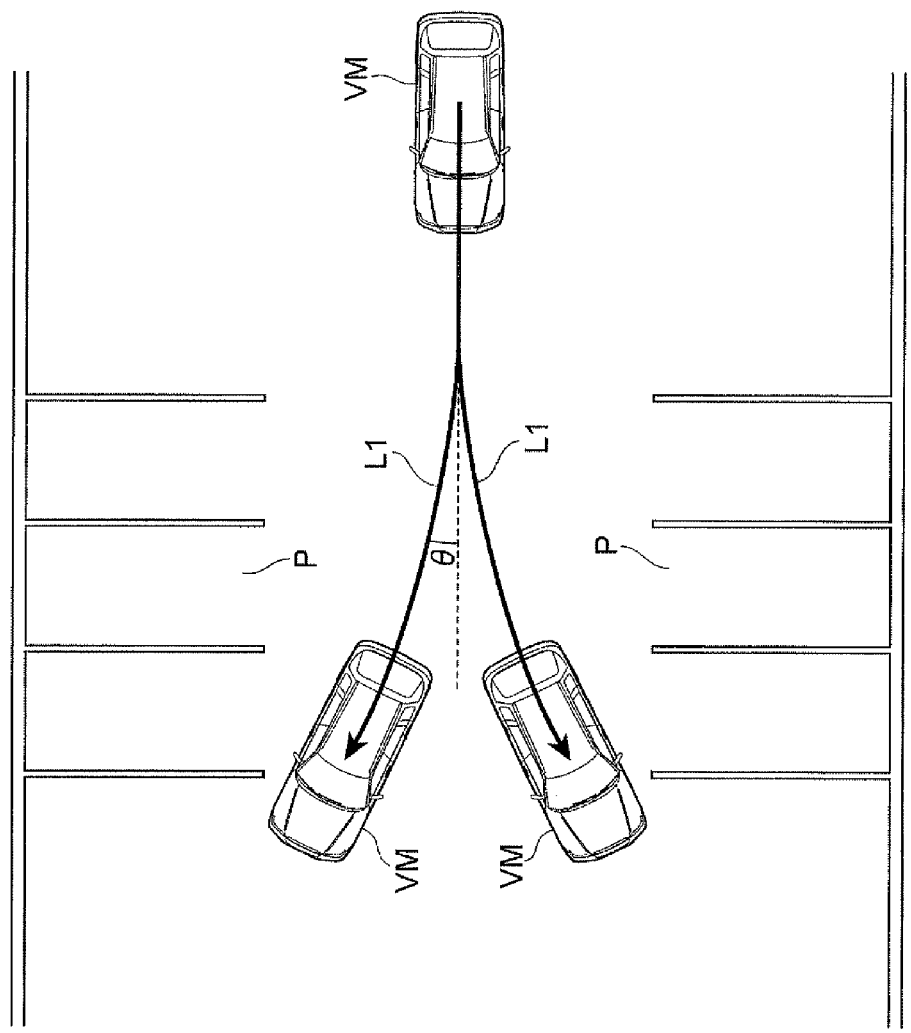
FIG. 4 is a plan view illustrating an aspect in which the vehicle provided with the parking assistance device according to the embodiment enters a parking lot.

Next, each operation will be described in detail. As shown in FIG. 4, when the host vehicle VM enters the parking lot in which the parking areas are placed on both sides of the traveling path of the parking lot, the assistance switch 11 is turned on (S101) and the drawing arithmetic unit 21 of the ECU 20 of the parking assistance device 10 initializes the traveling angle θ of the host vehicle VM to 0 (S102). The drawing arithmetic unit 21 acquires the magnitude and direction of the traveling angle θ, which is an angle formed between the front-rear direction of the host vehicle VM and the direction of the traveling path in the parking lot, from the information obtained by the steering angle sensor 12, the yaw rate sensor 13, the vehicle speed sensor 14, or the GPS 16 and the information stored in the database 22 (S103).

In this case, for the acquisition of the traveling angle θ, the traveling angle θ is initialized to 0, considering that the host vehicle VM travels in parallel to the direction of the traveling path in the parking lot when the assistance switch 11 is turned on, and the magnitude and direction of the traveling angle θ can be acquired on the basis of the values detected by the steering angle sensor 12, the yaw rate sensor 13, and the vehicle speed sensor 14. Alternatively, the magnitude and direction of the traveling angle θ can be acquired from the information obtained by the GPS 16 and the information stored in the database 22. In this embodiment, the relationship between the front-rear direction of the parking area P and the front-rear direction of the host vehicle VM is determined by the traveling angle θ. However, the relationship between the front-rear direction of the parking area P and the front-rear direction of the host vehicle VM may be acquired from the distance between each portion of the parking area P and the host vehicle VM or the distance or angle between another vehicle VO parked in the parking area P and the host vehicle VM, in addition to the traveling angle θ.

When the traveling angle θ is equal to or greater than a threshold value (S104), the drawing arithmetic unit 21 displays the trajectory when the host vehicle moves forward at the current steering angle and the trajectory when the host vehicle is reversed at the constant steering angle or the range of the trajectory when the host vehicle is reversed at a constant steering angle in a predetermined range on the display 31 so as to be superimposed on the bird's-eye image of the entire host vehicle VM, the bird's-eye image of the front portion of the host vehicle VM, and the image of the rear portion of the host vehicle VM which are captured by the front camera 51, the rear camera 52, and the left and right cameras 53, on the basis of the magnitude and direction of the traveling angle θ (S105).

In this embodiment, in practice, for the image of the rear side of the host vehicle VM captured by the rear camera 17, the trajectory or the range of the trajectory can be displayed so as to be superimposed on the image of the rear portion of the host vehicle VM which has not been processed into a bird's-eye image. However, in the following description, for convenience of explanation, the trajectory or the range of the trajectory displayed on the display 31 is virtually displayed as a bird's-eye image on the plane. However, in this embodiment, in practice, the image of the rear side of the host vehicle VM may be two-dimensionally displayed as a bird's-eye image on the display 31 and the trajectory of the host vehicle VM may be displayed so as to be superimposed on the bird's-eye image. Alternatively, the trajectory of the host vehicle VM may be displayed so as to be superimposed on, for example, the map of the navigation system.

Figure 5:
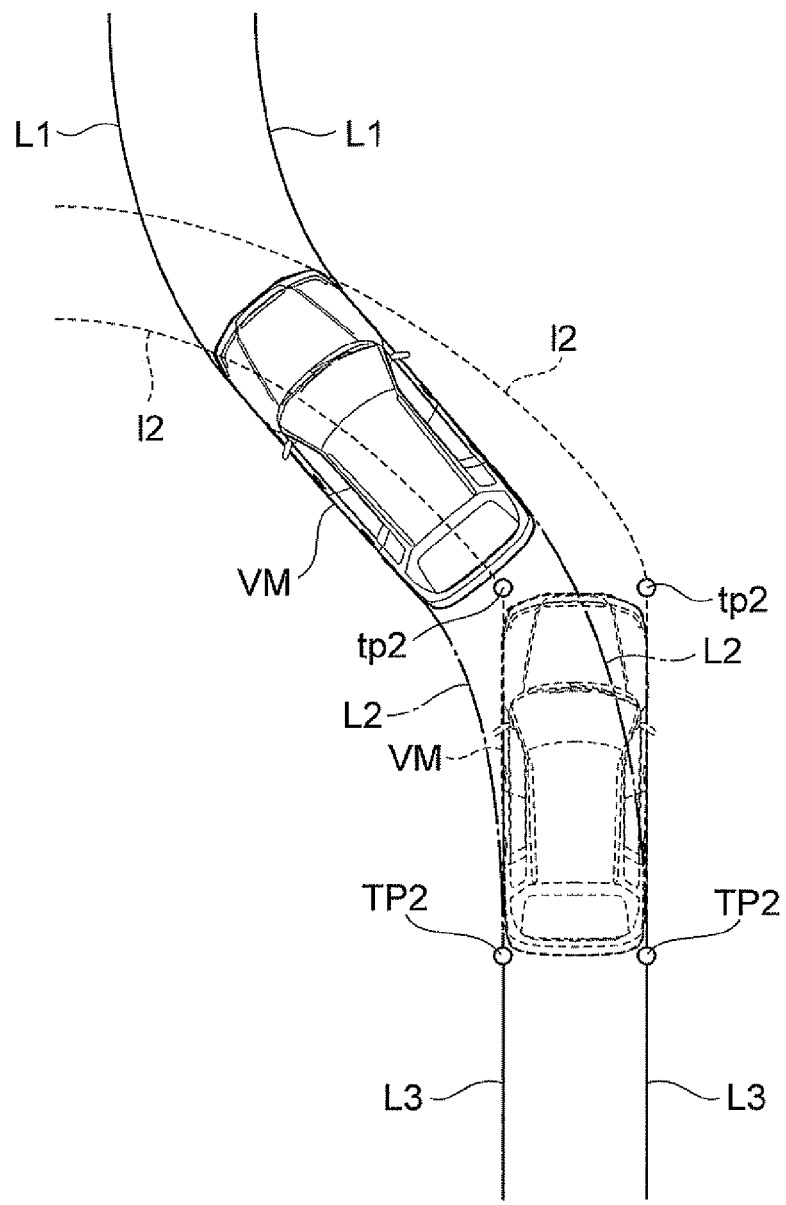
FIG. 5 is a diagram illustrating trajectories displayed on a display of the parking assistance device according to the embodiment.

For example, when the host vehicle VM moves forward along the traveling path of the parking lot while turning right, and draws the trajectory L1, as shown in FIG. 5, the drawing arithmetic unit 21 draws the trajectory L1 of a pair of front wheels or the left and right ends of the front bumper when the host vehicle continuously moves forward at the current steering angle. In addition, the drawing arithmetic unit 21 draws a trajectory L2 which is the trajectory of a pair of rear wheels when the host vehicle turns left at a constant steering angle in the reverse direction. The trajectory L2 extends backward from the current position of the host vehicle VM and is parallel to the front-rear direction of the parking area P at the turning point TP2 which is the rear end of the trajectory L2. The drawing arithmetic unit 21 draws a trajectory L3 which is the trajectory of a pair of rear wheels when the host vehicle is steered at a steering angle of 0 from the turning point TP2 which is the rear end of the trajectory L2. The trajectory L3 is parallel to the front-rear direction of the parking area P.

In addition, the drawing arithmetic unit 21 draws a trajectory l2, which is the trajectory of a pair of front wheels when the host vehicle turns left at a constant steering angle in the reverse direction or the trajectory of the left and right ends of the front bumper. The trajectory l2 extends in the front-rear direction of the host vehicle VM at the current position and is terminated at a turning point tp2 which is the position of the front wheels of the host vehicle VM or the left and right portions of the front end of the host vehicle VM when the rear wheel or the rear end of the host vehicle VM reaches the turning point TP2. In this embodiment, a pair of trajectories l2 are drawn. However, one trajectory of the front wheel or the front end of the host vehicle VM outside the turning side may be drawn and the two trajectories l2 are not necessarily drawn.

Figure 6:
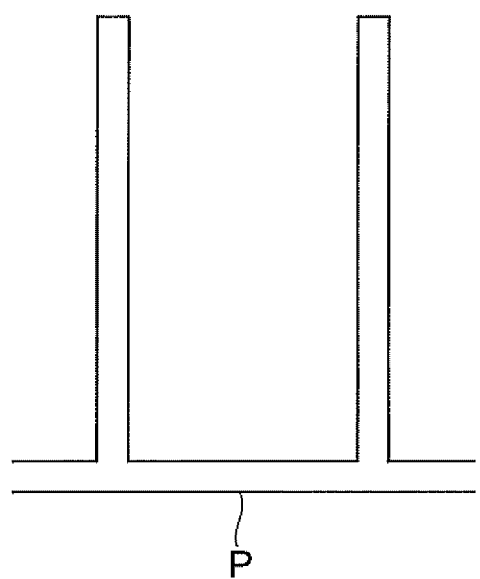
FIG. 6 is a diagram illustrating the image of the parking area displayed on the display of the parking assistance device according to the embodiment.
Figure 7:
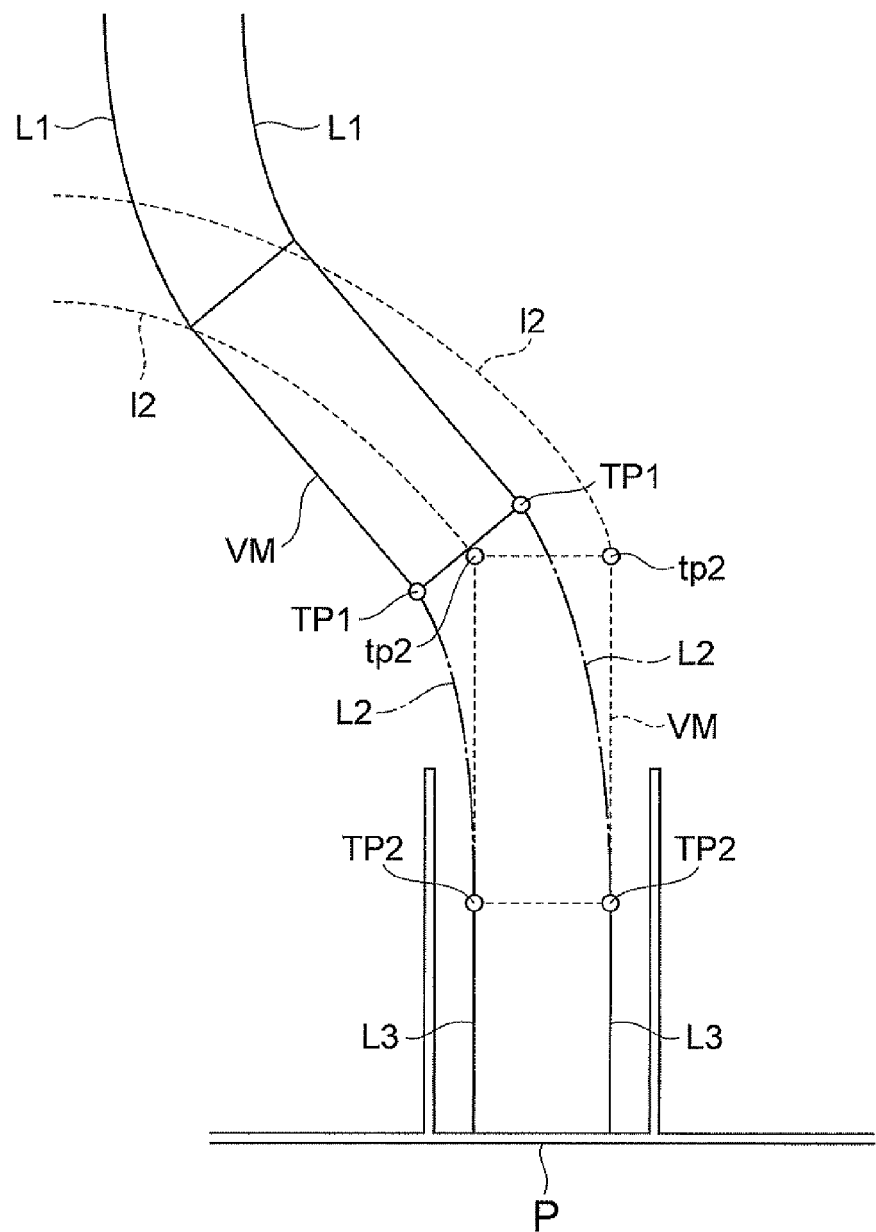
FIG. 7 is a diagram illustrating the image of the parking area and the trajectories which are displayed on the display of the parking assistance device according to the embodiment so as to be superimposed on each other.
Figure 8:
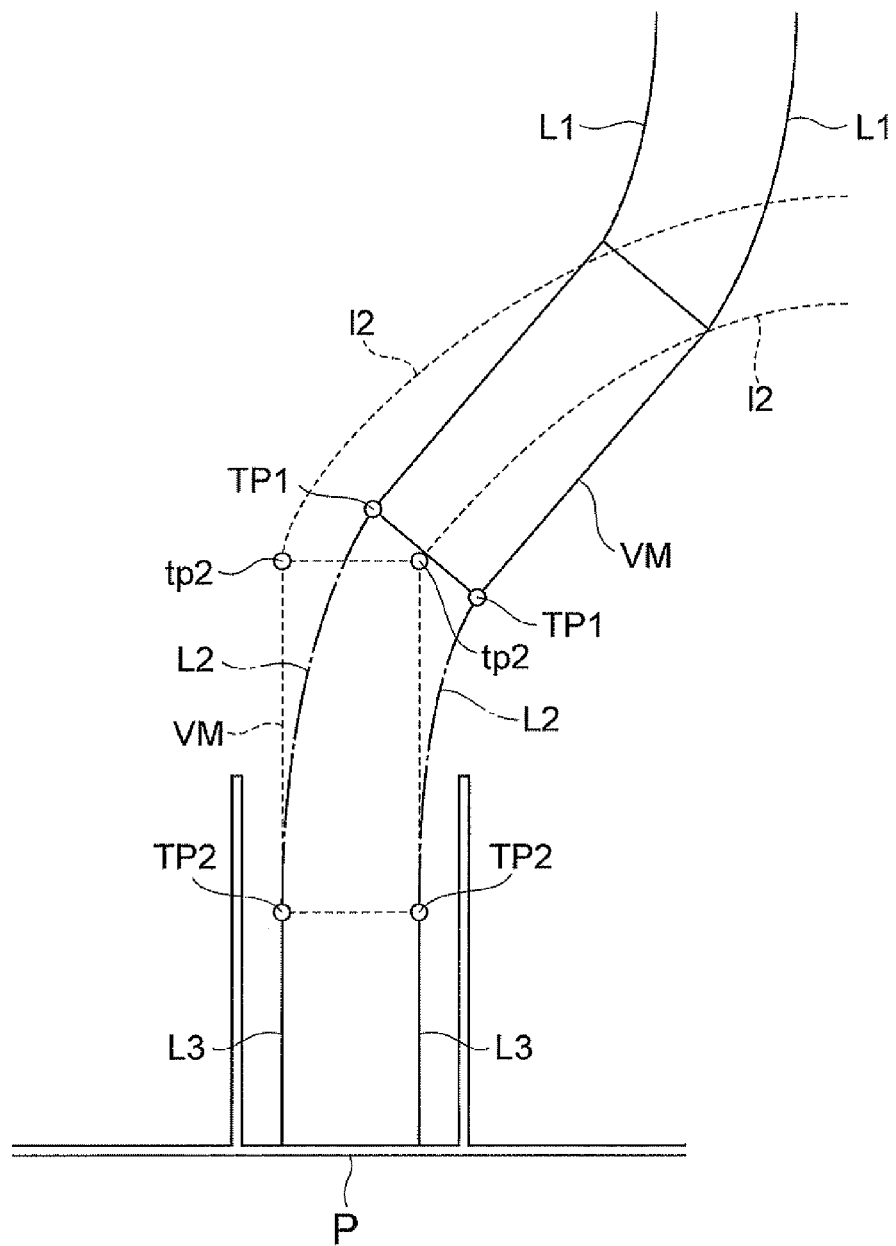
FIG. 8 is a diagram illustrating the image of the parking area and the trajectories which are displayed on the display so as to be superimposed on each other when the vehicle moves forward while turning left in the parking lot.

As shown in FIG. 6, the image of the parking area P captured by the rear camera is displayed on the display 31. As shown in FIG. 7, the drawing arithmetic unit 21 displays the trajectory L1, the trajectories L2 and l2, and the trajectory L3 shown in FIG. 5 so as to be superimposed on the image of the parking area P shown in FIG. 6. When the host vehicle VM moves forward along the traveling path in the parking lot while turning left to draw the trajectory L1, as shown in FIG. 8, the drawing arithmetic unit 21 displays the trajectory L1 of a pair of front wheels when the host vehicle continuously moves forward at the steering angle at which the host vehicle turns left from the current position, the trajectory L2 which is the trajectory of a pair of rear wheels when the host vehicle turns right at a constant steering angle in the reverse direction, the trajectory l2 which is the trajectory of a pair of front wheels or the front end when the host vehicle turns right at a constant steering angle in the reverse direction, and the trajectory L3 so as to be superimposed on the image of the parking area P, similarly to FIG. 7.

As a method of determining whether the host vehicle VM is parked in the left or right parking area P, the driver may input information indicating the parking position, or the left or right parking area P into which the host vehicle VM will be parked may be set for each parking lot in advance on the basis of the positioning information of the GPS 16 and information stored in the database 22.

Figure 9:
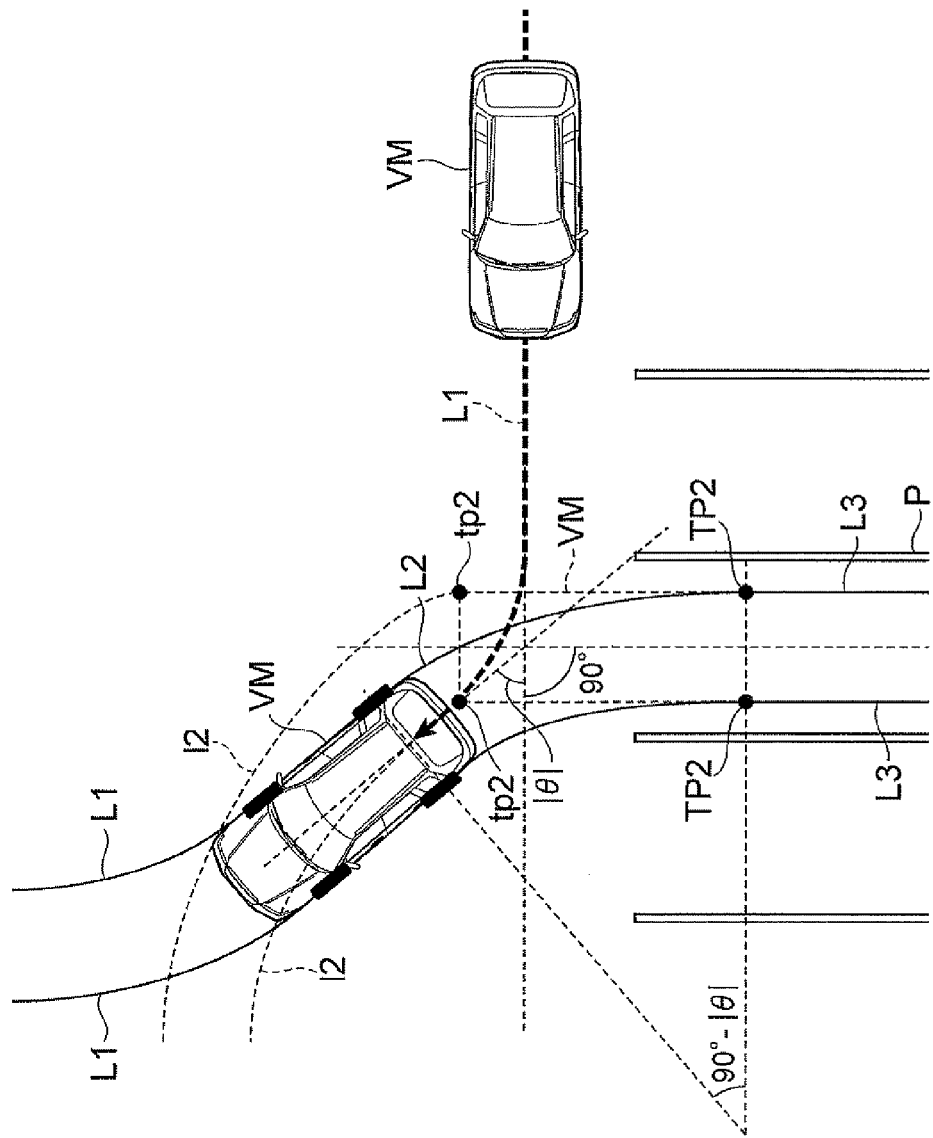
FIG. 9 is a plan view illustrating a trajectory drawing method when the angle formed between the direction of the parking area and an access road to the parking lot is 90°.

Next, a method of drawing the trajectories L2, l2, and L3 on the display 31 will be described in detail. As shown in FIG. 9, when the angle formed between the direction of the traveling path in the parking lot and the front-rear direction of the parking area P is 90°, the drawing arithmetic unit 21 can draw an arc having a central angle of (90°—a traveling angle |θ|) with respect to a predetermined steering angle from a pair of rear wheels of the host vehicle VM to draw the trajectory L2 which is parallel to the front-rear direction of the parking area P at the rear end of the arc. The drawing arithmetic unit 21 can draw the trajectory L3 which extends in a straight line from the rear end of the trajectory L2 in the same direction as the rear end of the trajectory L2. For the trajectory l2, the drawing arithmetic unit 21 can draw an arc having a central angle of (90°—a traveling angle |θ|) with respect to a predetermined steering angle from a pair of front wheels or the front ends of the left and right portions of the host vehicle VM to draw the trajectory l2 terminated at the turning point tp2 which is the position of the front wheels or the front ends of the left and right portions of the host vehicle VM when the rear wheel or the rear end of the host vehicle VM reaches the turning point TP2.

Figure 10:
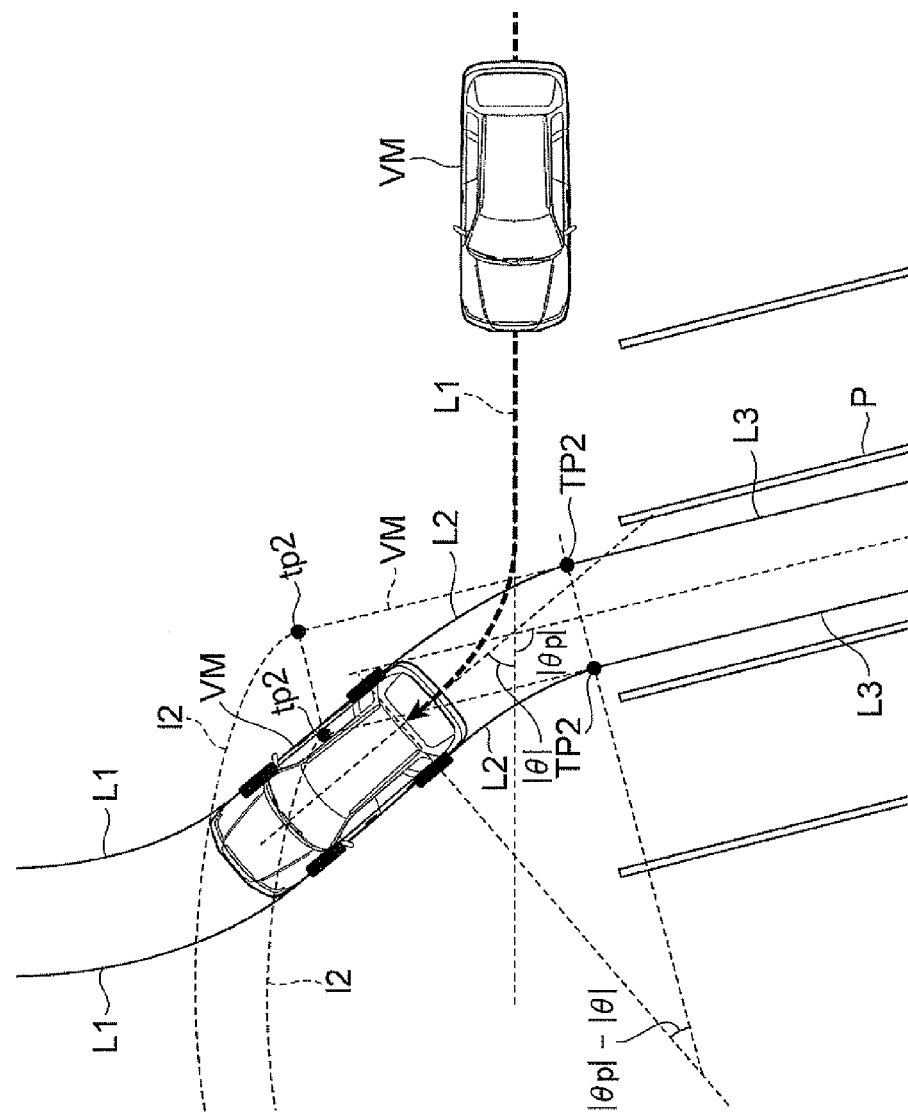
FIG. 10 is a plan view illustrating a trajectory drawing method when the angle formed between the direction of the parking area and the access road to the parking lot is not 90°.

As shown in FIG. 10, when the angle formed between the direction of the traveling path in the parking lot and the front-rear direction of the parking area P is |θp| other than 90°, the drawing arithmetic unit 21 can draw an arc having a central angle of (|θp|—the traveling angle |θ|) with respect to a predetermined steering angle from a pair of rear wheels of the host vehicle VM to draw the trajectory L2 which is parallel to the front-rear direction of the parking area P at the rear end of the arc. The trajectory L3 is the same as that when the angle formed between the direction of the traveling path in the parking lot and the front-rear direction of the parking area P is 90°. For the trajectory l2, the drawing arithmetic unit 21 can draw an arc having a central angle of (|θp|—the traveling angle |θ|) with respect to a predetermined steering angle from a pair of front wheels or the front ends of the left and right portions of the host vehicle VM to draw the trajectory l2 terminated at the turning point tp2 which is the position of the front wheels or the front ends of the left and right portions of the host vehicle VM when the rear wheel or the rear end of the host vehicle VM reaches the turning point TP2.

The drawing arithmetic unit 21 displays the trajectories L2 and l2 using the method shown in FIGS. 9 and 10 such that, as the angle formed between the front-rear direction of the parking area P in which the host vehicle VM is parked and the front-rear direction of the host vehicle increases, the length of the trajectories L2 and l2 of the curved portion increases and, as the angle formed between the front-rear direction of the parking area P in which the host vehicle VM is parked and the front-rear direction of the host vehicle is reduced, the length of the trajectories L2 and l2 of the curved portion is reduced.

In the case of parallel parking in which the direction of the traveling path in the parking lot is parallel to the front-rear direction of the parking area, the drawing arithmetic unit 21 displays, for example, the trajectory L1 and the trajectories L2, l2, and L3, which are combinations of a straight line and two arcs which have the same central angle and different left and right turning directions, on the display 31 so as to be superimposed on the image of the parking area P, thereby notifying the driver of the host vehicle VM of a reverse start position.

The parking assistance device 10 can recognize the parking area P or another vehicle VO using, for example, the laser radar 18 and the sonar 19, and notify the driver of the host vehicle VM of the reverse start position with a sound from the speaker 32. Alternatively, the parking assistance device 10 can forcibly intervene in the driving operation of the driver using the traveling control unit 23, the brake actuator 42, and the steering actuator 43 to notify the driver of the host vehicle VM of the reverse start position. In addition, the parking assistance device 10 can give reaction force or tactile sensation based on haptic technology to the accelerator pedal or the steering wheel using the traveling control unit 23, the accelerator actuator 41, and the steering actuator 43 to notify the driver of the host vehicle VM of the reverse start position.

After the host vehicle VM is stopped at the reverse start position, such as the turning point TP1, the parking assistance device 10 may enable the driver of the host vehicle VM to set the parking area P and the trajectories L2, l2, and L3 while displaying the image of the rear side of the host vehicle VM on the display 31. Even when the driver forgets to operate the assistance switch 11, the parking assistance device 10 may recognize the parking area P or another vehicle VO on the basis of the information obtained by the laser radar 18, the sonar 19, and the GPS 16 and the information stored in the database 22 when the host vehicle moves forward along the trajectory L1, estimate the traveling angle θ and the front-rear direction of the parking area P, and display the trajectory L1, the trajectories L2 and l2, and the trajectory L3 so as to be superimposed on the image of the parking area P.

The trajectories L2, l2, and L3 which do not correspond to the current steering angle of the host vehicle, but are based on the angle formed between the front-rear direction of the host vehicle VM and the front-rear direction of the parking area P may be displayed on the display 31 at least while the host vehicle VM is stopped or is moving forward, or they may be constantly displayed when the host vehicle VM is reversed. Alternatively, as described above, when the host vehicle VM is reversed, only one kind of trajectories L2, l2, and L3 corresponding to the steering angle of the host vehicle VM may be displayed on the display 31, and the trajectories L2, l2, and L3 which do not correspond to the current steering angle of the host vehicle VM, but are based on the angle formed between the front-rear direction of the host vehicle VM and the front-rear direction of the parking area P may be removed from the display 31.

In the above-mentioned example, it is determined whether the host vehicle VM is moving forward, is stopped, or is being reversed on the basis of the value detected by the transmission shift position sensor 15. However, it may be determined whether the host vehicle VM is moving forward, is stopped, or is being reversed on the basis of, for example, an accelerator operation or a brake operation, or the value detected by the vehicle speed sensor 14 or the GPS 16.

Figure 11:
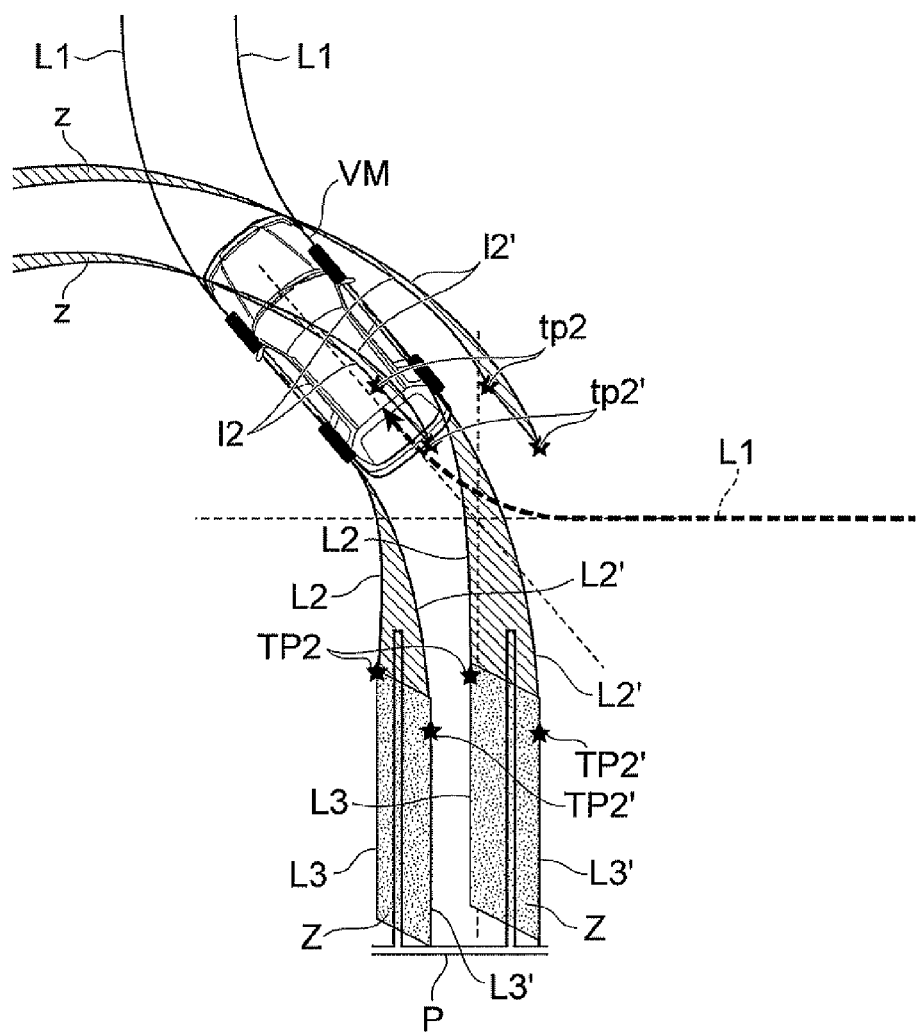
FIG. 11 is a diagram illustrating the image of the parking area and the range of a trajectory obtained by a steering angle in a predetermined range which are displayed on the display of the parking assistance device according to the embodiment so as to be superimposed on each other.

As shown in FIGS. 7 to 10, the drawing arithmetic unit 21 can display one kind of trajectories L2, l2, and L3 on the display 31. However, in this embodiment, it is possible to display the range of the trajectories L2 and l2, which are arcs with different turning radii (steering angles), and the trajectory L3 connected to the trajectory L2. As shown in FIG. 11, the drawing arithmetic unit 21 can display the trajectory L2 obtained by a steering angle α1, which is the maximum steering angle, and a trajectory L2' obtained by a steering angle α2 that is 70% of the maximum steering angle. Straight trajectories L3 and L3' extend from turning points TP2 and TP2' which are the rear ends of the trajectories L2 and L2', respectively. The drawing arithmetic unit 21 displays a trajectory range Z, which is a range surrounded by the trajectories L2 to L3' for each of a pair of rear wheels, as a shaded area on the display 31 so as to be superimposed on the image of the parking area P.

Similarly, the drawing arithmetic unit 21 can display, for example, the trajectory l2 obtained by the steering angle α1, which is the maximum steering angle, and a trajectory l2' obtained by the steering angle α2 that is 70% of the maximum steering angle. The drawing arithmetic unit 21 determines turning points tp2 and tp2', which are the front ends of the host vehicle VM, on the basis of the turning points TP2 and TP2', which are the rear ends of the trajectories L2 and L2'. The drawing arithmetic unit 21 draws the trajectories l2 and l2' so as to be terminated at the turning points tp2 and tp2', respectively. The drawing arithmetic unit 21 displays a trajectory range z, which is a range surrounded by the trajectories L2 and l2' for each of a pair of front wheels or the front ends of the left and right portions, as a shaded area on the display 31 so as to be superimposed on the image of the parking area P.

Figure 12:
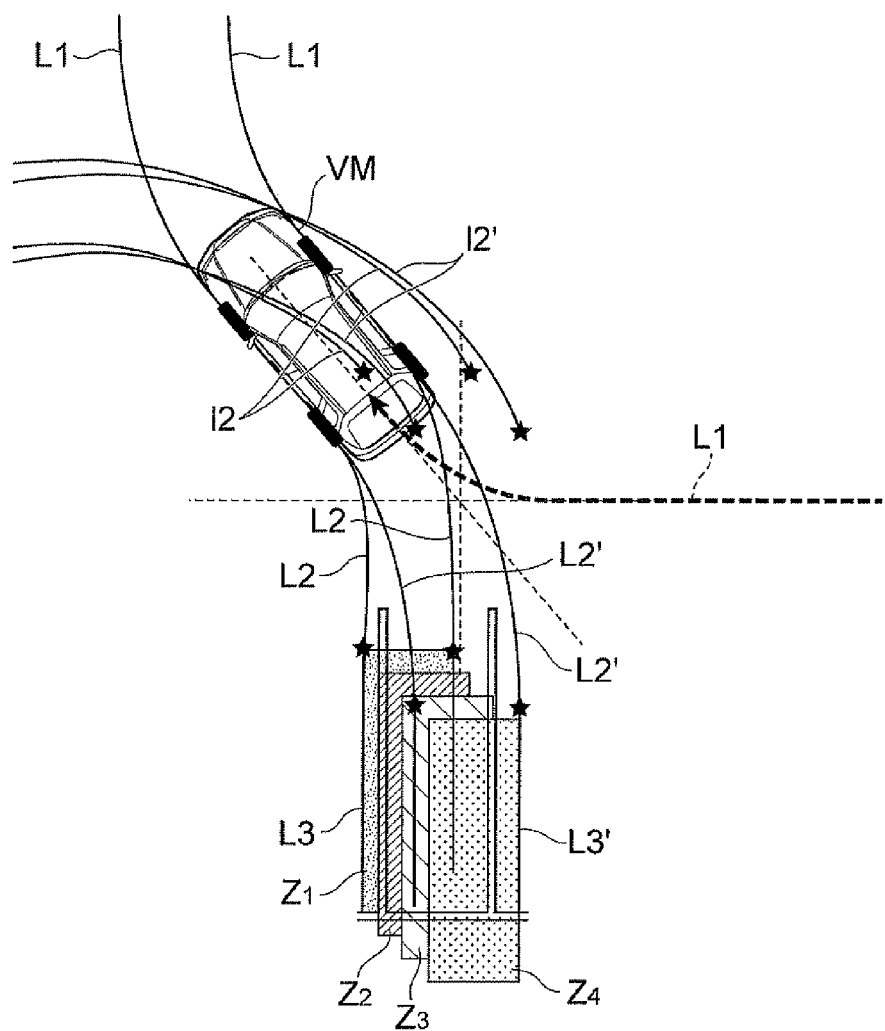
FIG. 12 is a diagram illustrating another example of the display shown in FIG. 11.

Alternatively, as shown in FIG. 12, the drawing arithmetic unit 21 can display a trajectory range $Z_1$, which is a range surrounded by the trajectories L2 and L3 for a pair of rear wheels, and a trajectory range $Z_4$, which is a range surrounded by the trajectories L2' and L3' for a pair of rear wheels, as shaded areas on the display 31 so as to be superimposed on the image of the parking area P. In addition, the drawing arithmetic unit 21 can draw the trajectories for each predetermined angle for the steering angle between the trajectories L2 and L2' and display ranges which are surrounded by a pair of rear wheels as trajectory ranges $Z_2$ and $Z_3$. In this way, it is possible to provide a plurality of reverse start position candidates to the driver.

Figure 13:
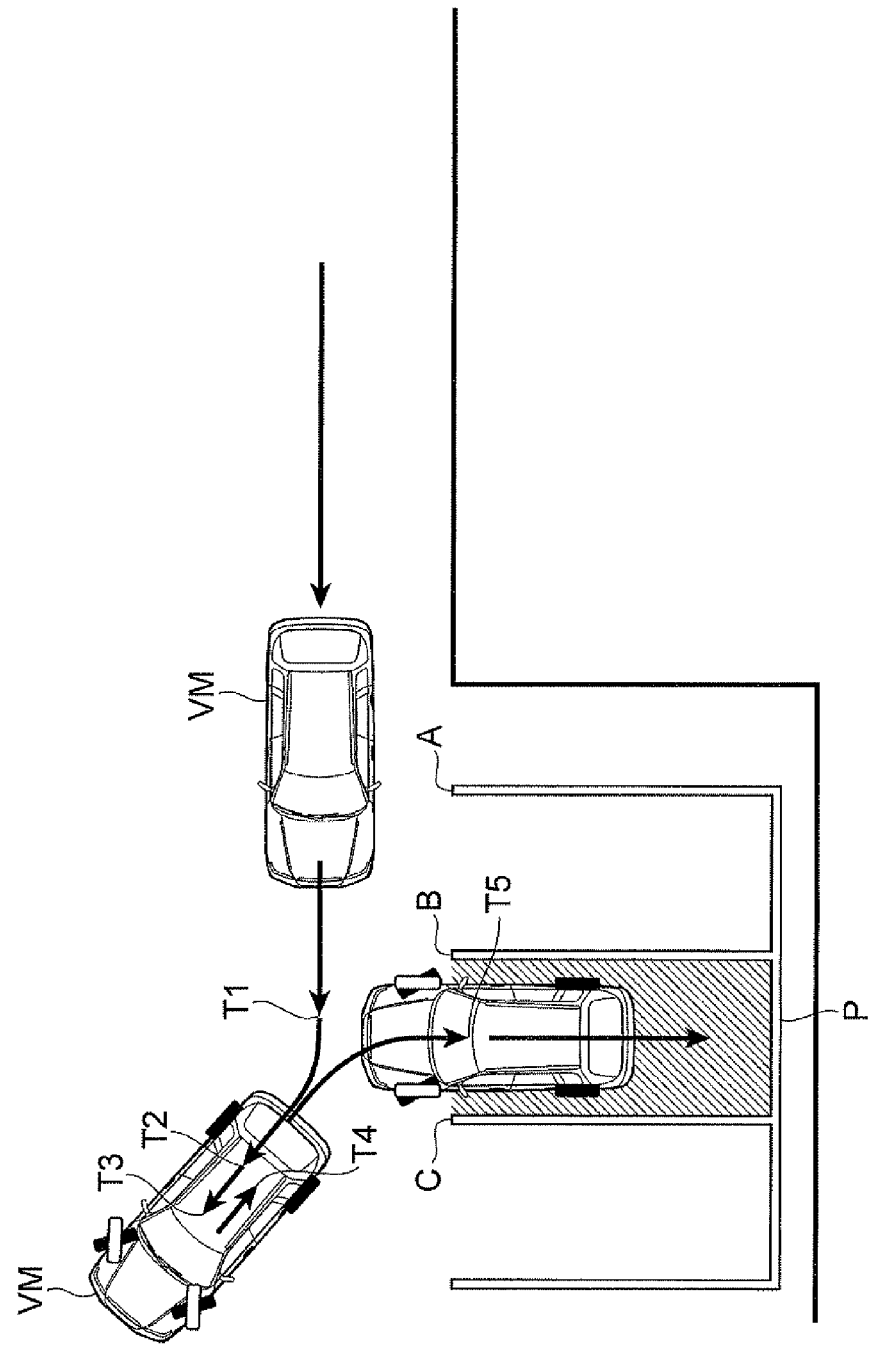
FIG. 13 is a plan view illustrating the position of the host vehicle at times T1 to T5 in FIG. 3.
Figure 14:
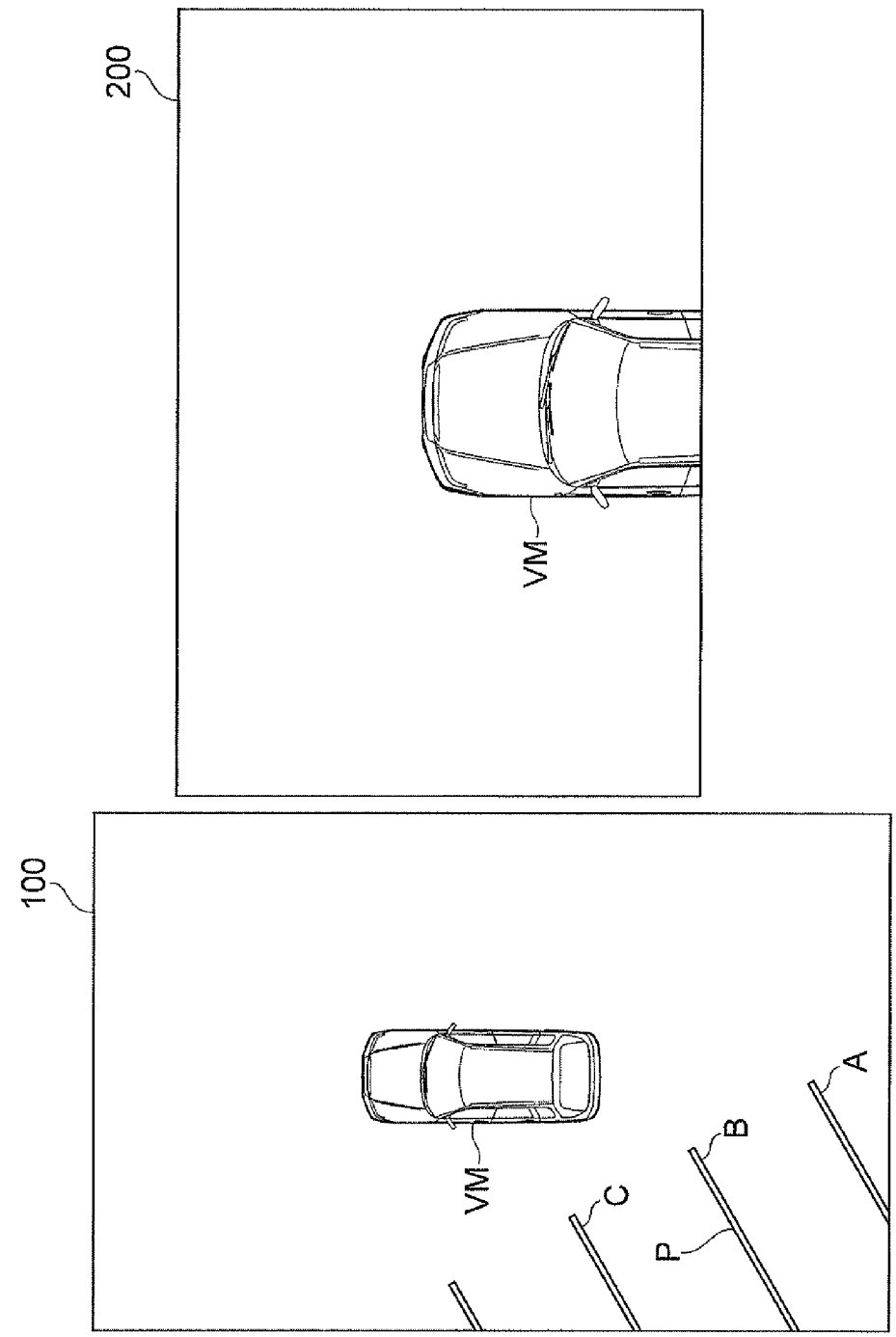
FIG. 14 is a diagram illustrating a bird's-eye image and a front bird's-eye image which are actually displayed on the display of the parking assistance device according to the embodiment before the time T1 shown in FIG. 13.
Figure 15:
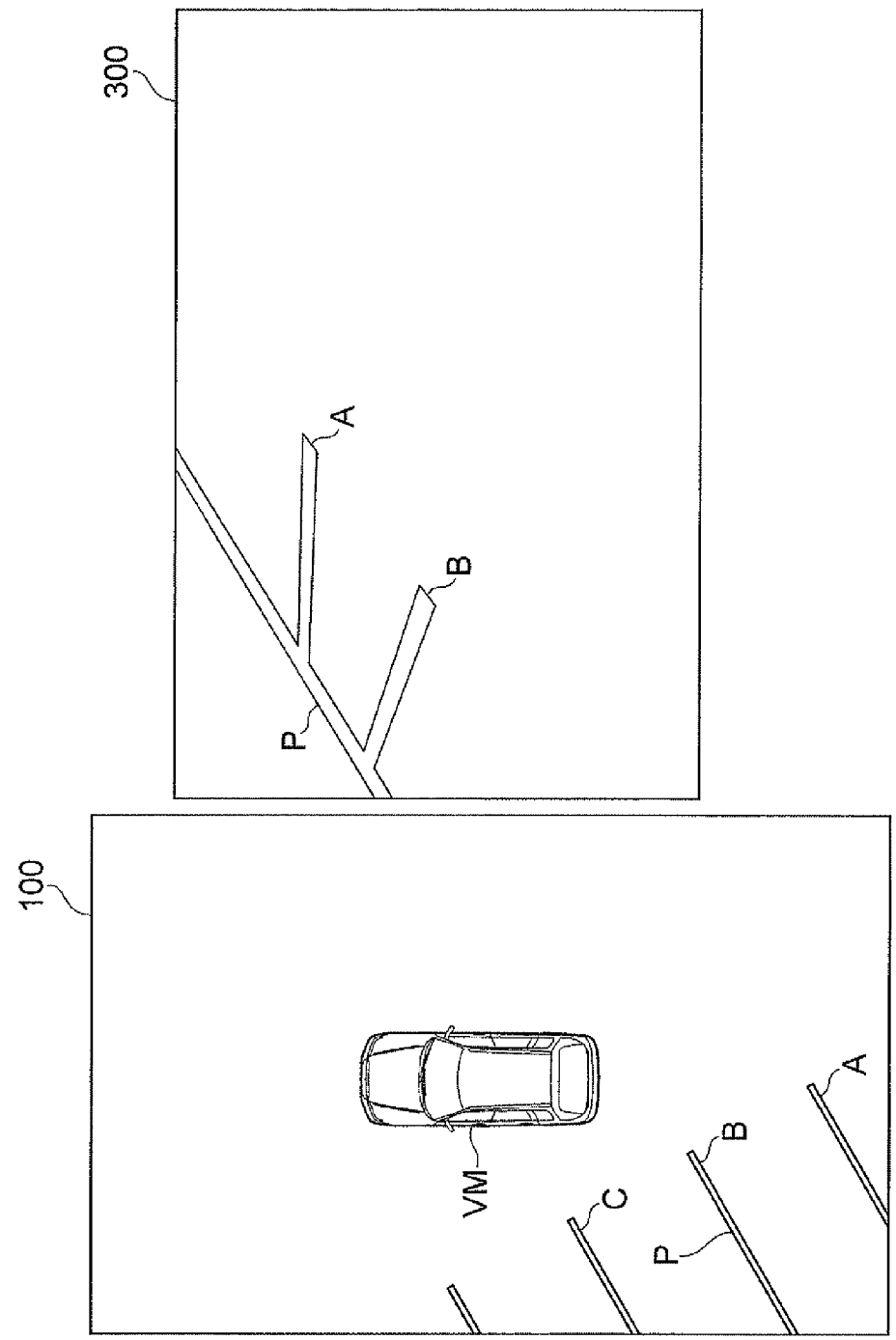
FIG. 15 is a diagram illustrating a bird's-eye image and a rear image which are actually displayed on the display of the parking assistance device according to the embodiment before the time T1 shown in FIG. 13.

Next, an example of the image which is actually displayed on the display 31 in the parking assistance device 10 according to this embodiment will be described. In the following description, as shown in FIG. 13, a situation in which the host vehicle VM is parked into the parking area P having white lines A to C is assumed. When the host vehicle VM moves forward along the traveling path in the parking lot and the driver turns on the assistance switch 11, as shown in FIG. 14, a bird's-eye image 100 of the entire host vehicle VM and a front bird's-eye image 200 of the front portion of the host vehicle VM which are captured by the front camera 51, the rear camera 52, and the left and right cameras 53 are displayed on the display 11. In this case, as shown in FIG. 15, when the driver appropriately operates the image switch 30, the bird's-eye image 100 of the entire host vehicle VM and a rear image 300 of the rear portion of the host vehicle VM are displayed on the display 11.

In this embodiment, in principle, when there is no operation of the driver, the drawing arithmetic unit 21 starts to display the trajectories L1, L2 (L2'), l2 (l2'), and L3 (L3') and the trajectory ranges Z and z on the display 31 so as to be superimposed on the image of the parking area P after the image of the parking area P is displayed on the display 31. In order to start to display the trajectories L2 and L3 and the trajectory range Z so as to be superimposed on the image of the parking area P after the image of the parking area P is displayed on the display 31, as described above, after the traveling angle θ is equal to or greater than a predetermined threshold value, the drawing arithmetic unit 21 starts to display the trajectories L1, L2 (L2'), l2 (l2'), and L3 (L3') and the trajectory ranges Z and z. Alternatively, the drawing arithmetic unit 21 can recognize the parking area P using, for example, the laser radar 18, the sonar 19, the GPS 16, and the database 22, estimate the time and position when the image of the parking area P is displayed on the display 31, and start to display the trajectories L1, L2 (L2'), l2 (l2'), and L3 (L3') and the trajectory ranges Z and z so as to be superimposed on the image of the parking area P after the image of the parking area P is displayed on the display 31. In this case, the trajectories L1, L2 (L2'), l2 (l2'), and L3

(L3') may be displayed immediately before the image of the parking area P into which the host vehicle VM is parked is displayed on the bird's-eye image 100 or the rear image 300 or at the time when the image of the parking area P into which the host vehicle VM is parked is displayed on the bird's-eye image 100 or the rear image 300.

Figure 16:
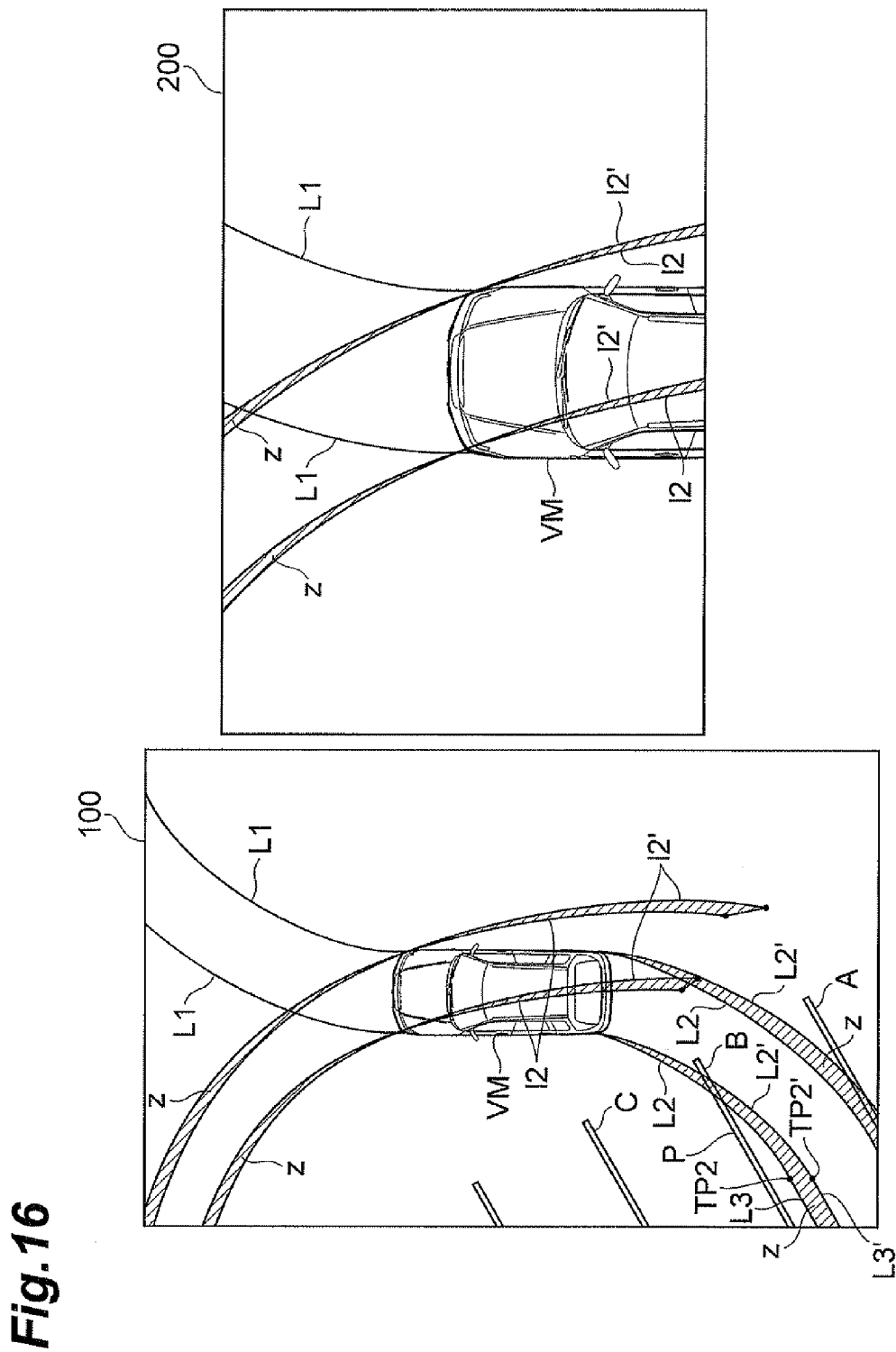
FIG. 16 is a diagram illustrating the bird's-eye image and the front bird's-eye image which are actually displayed on the display of the parking assistance device according to the embodiment at the time T1 shown in FIG. 13.
Figure 17:
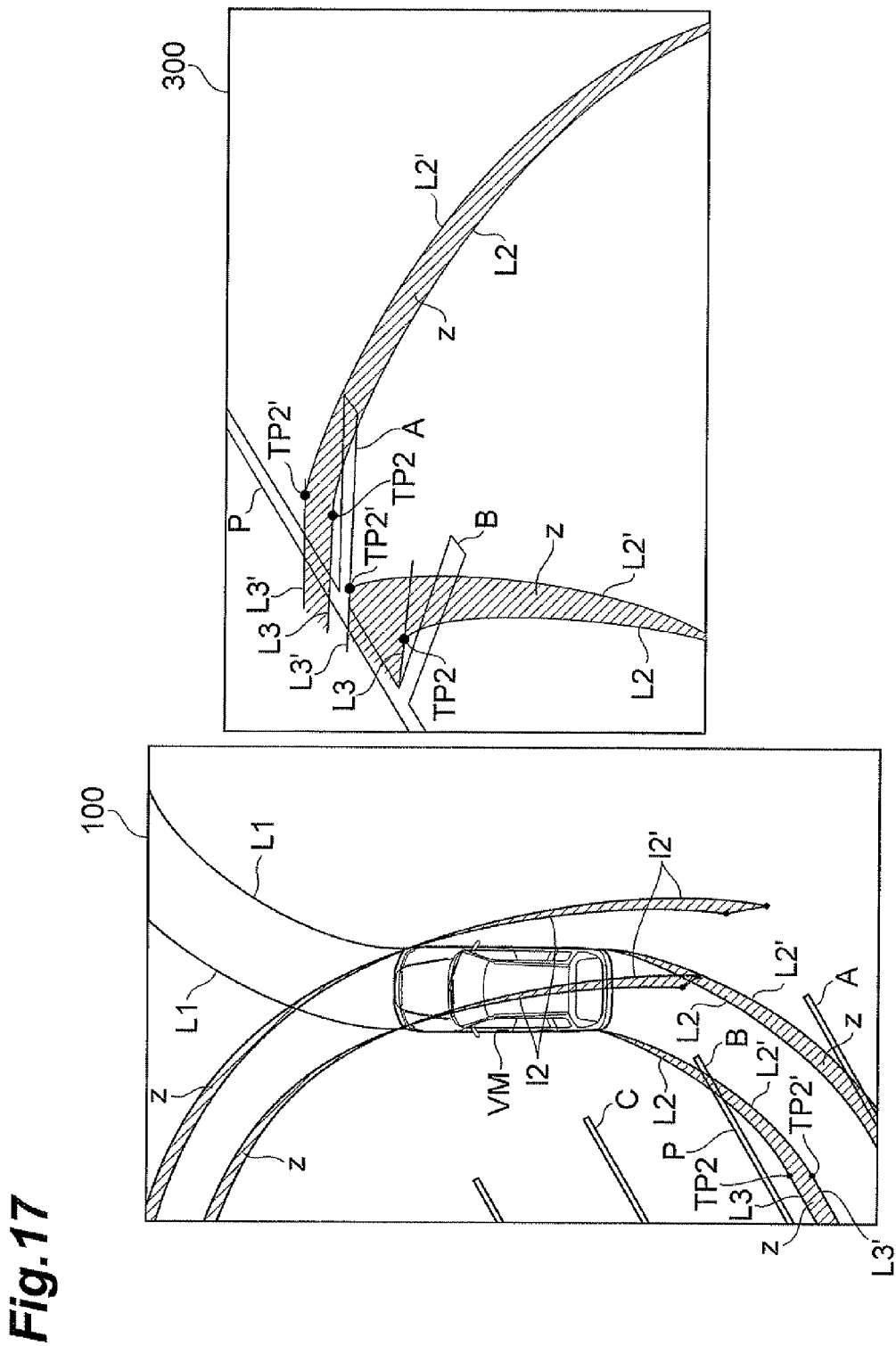
FIG. 17 is a diagram illustrating the bird's-eye image and the rear image which are actually displayed on the display of the parking assistance device according to the embodiment at the time T1 shown in FIG. 13.
Figure 18:
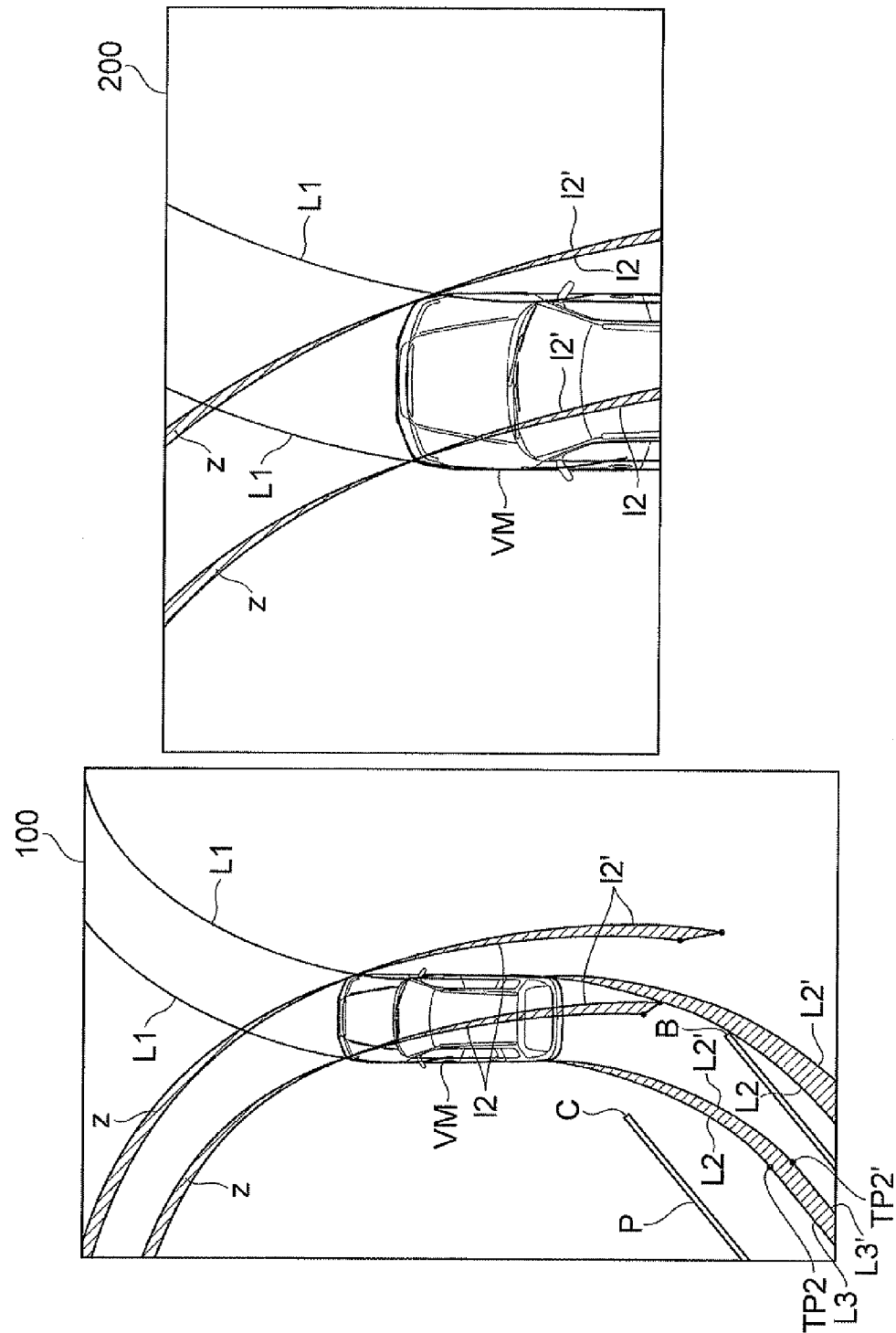
FIG. 18 is a diagram illustrating the bird's-eye image and the front bird's-eye image which are actually displayed on the display of the parking assistance device according to the embodiment at the time T2 shown in FIG. 13.
Figure 19:
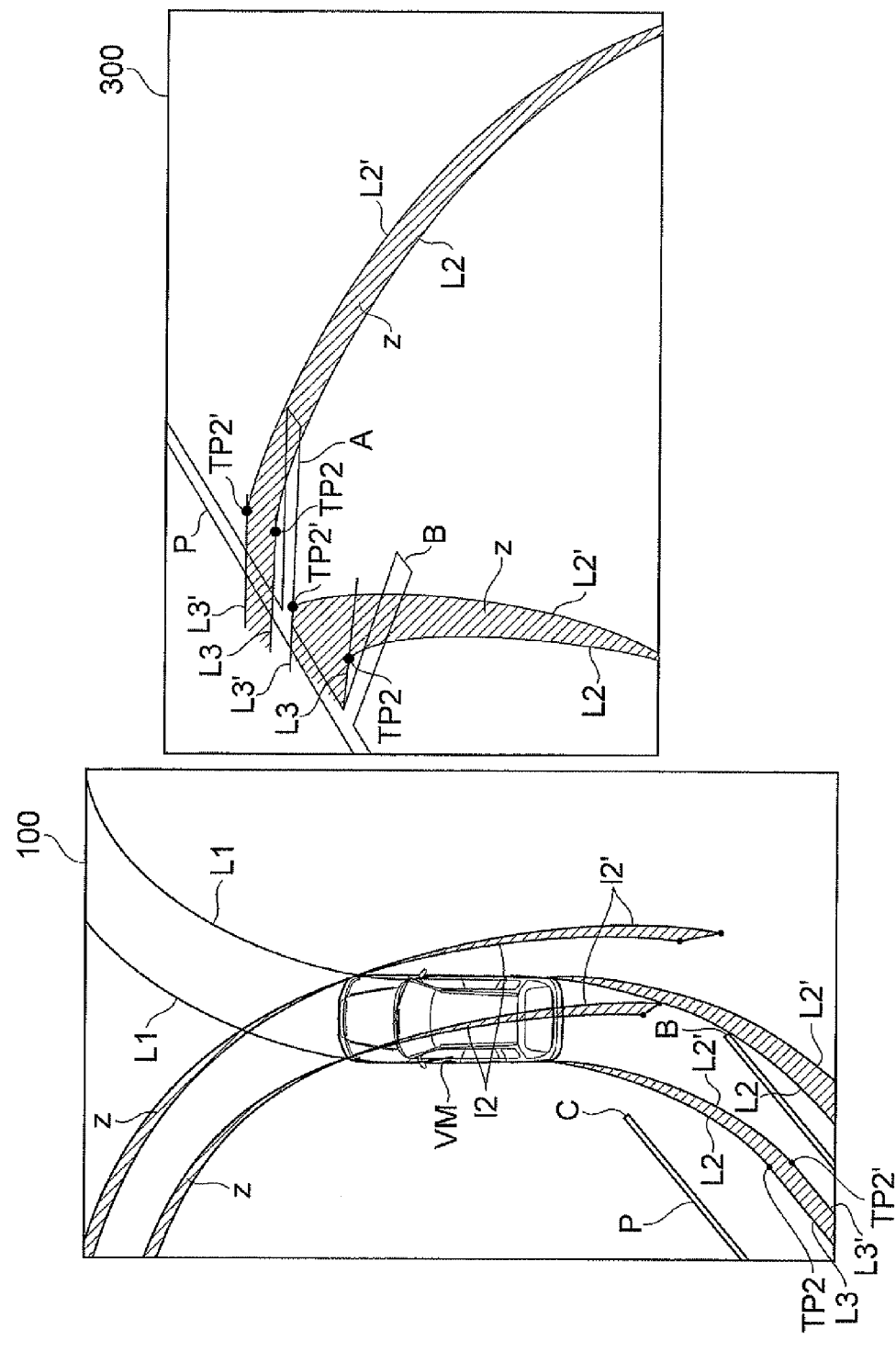
FIG. 19 is a diagram illustrating the bird's-eye image and the rear image which are actually displayed on the display of the parking assistance device according to the embodiment at the time T2 shown in FIG. 13.
Figure 20:
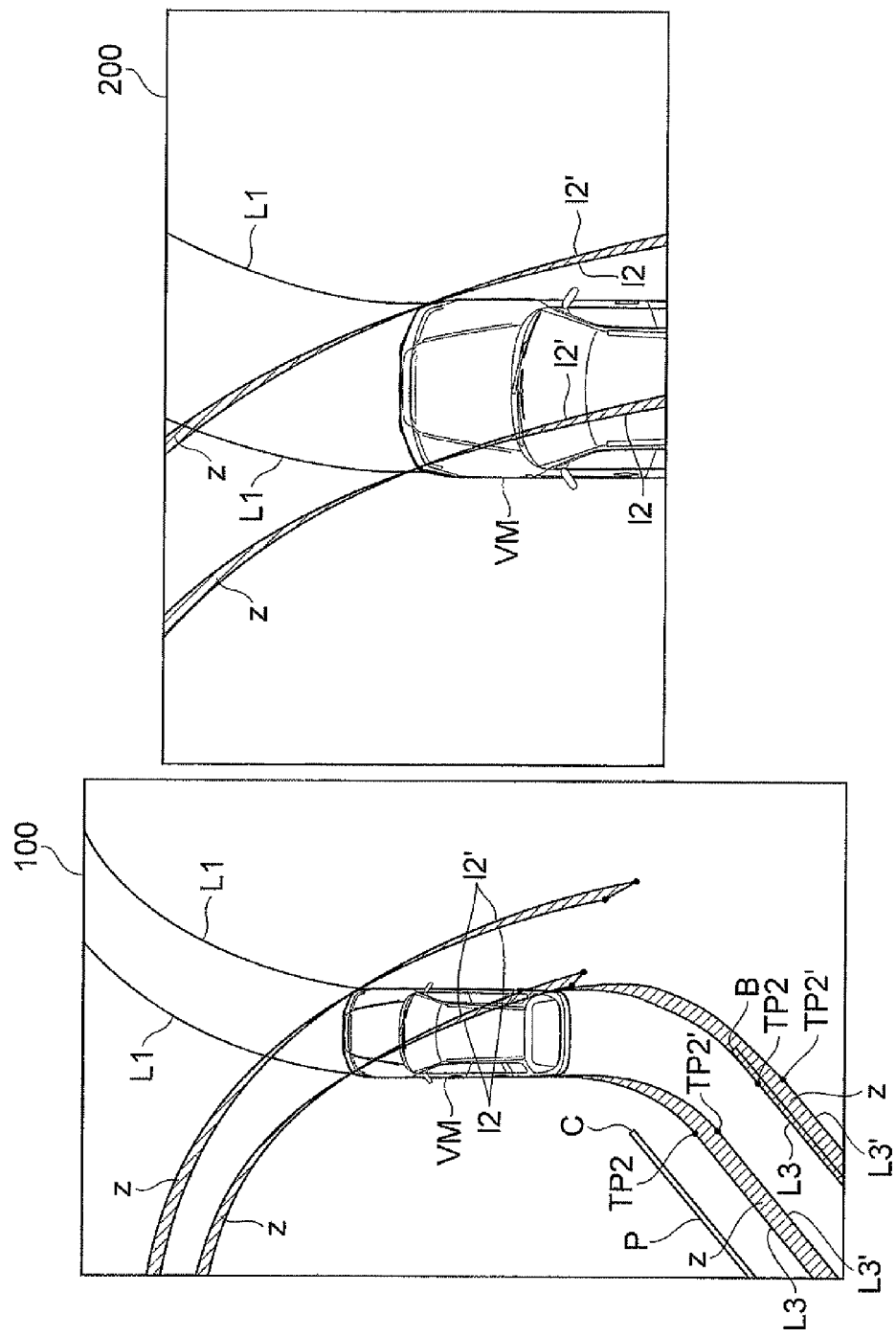
FIG. 20 is a diagram illustrating the bird's-eye image and the front bird's-eye image which are actually displayed on the display of the parking assistance device according to the embodiment at the time T3 shown in FIG. 13.
Figure 21:
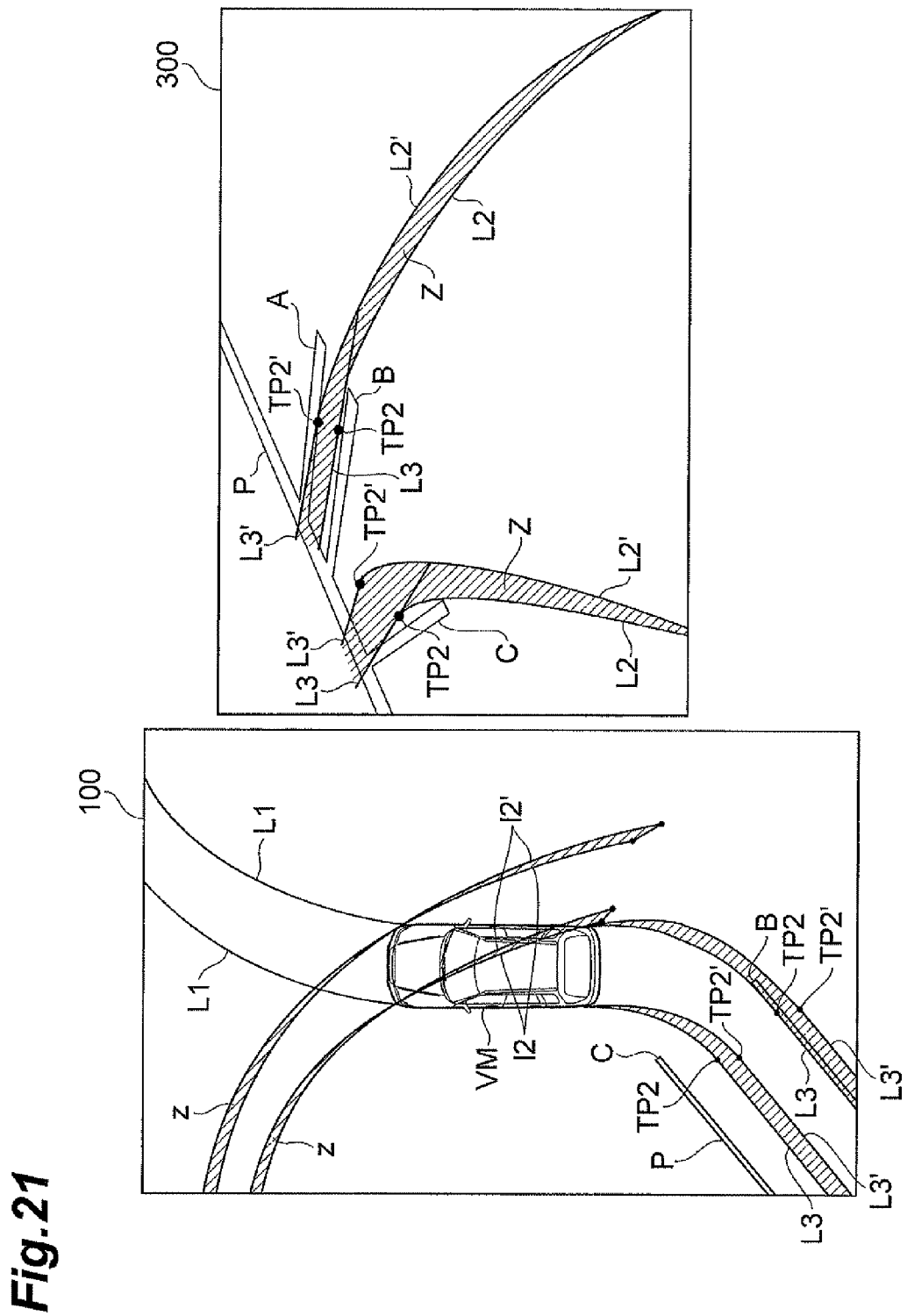
FIG. 21 is a diagram illustrating the bird's-eye image and the rear image which are actually displayed on the display of the parking assistance device according to the embodiment at the time T3 shown in FIG. 13.

When the traveling angle θ is greater than the threshold value at a time T1, the drawing arithmetic unit 21 displays the trajectories L1, L2 (L2'), l2 (l2'), and L3 (L3') and the trajectory ranges Z and z so as to be superimposed on the bird's-eye image 100 in which the parking area P is displayed and displays the trajectories L1 and l2 (l2') and the trajectory range z so as to be superimposed on the front bird's-eye image 200, as shown in FIG. 16. Alternatively, when the image switch 30 is appropriately operated, the drawing arithmetic unit 21 displays the trajectories L1, L2 (L2'), l2 (l2'), and L3 (L3') and the trajectory ranges Z and z so as to be superimposed on the bird's-eye image 100 in which the parking area P is displayed and displays the trajectories L2 (L2') and L3 (L3') and the trajectory range Z so as to be superimposed on the rear image 300, as shown in FIG. 17. When the time changes from a time T2 to a time T3 and the traveling angle θ increases, the trajectories L2 (L2') and L2' of the curved portion are shortened, as shown in FIGS. 18 to 21.

Figure 22:
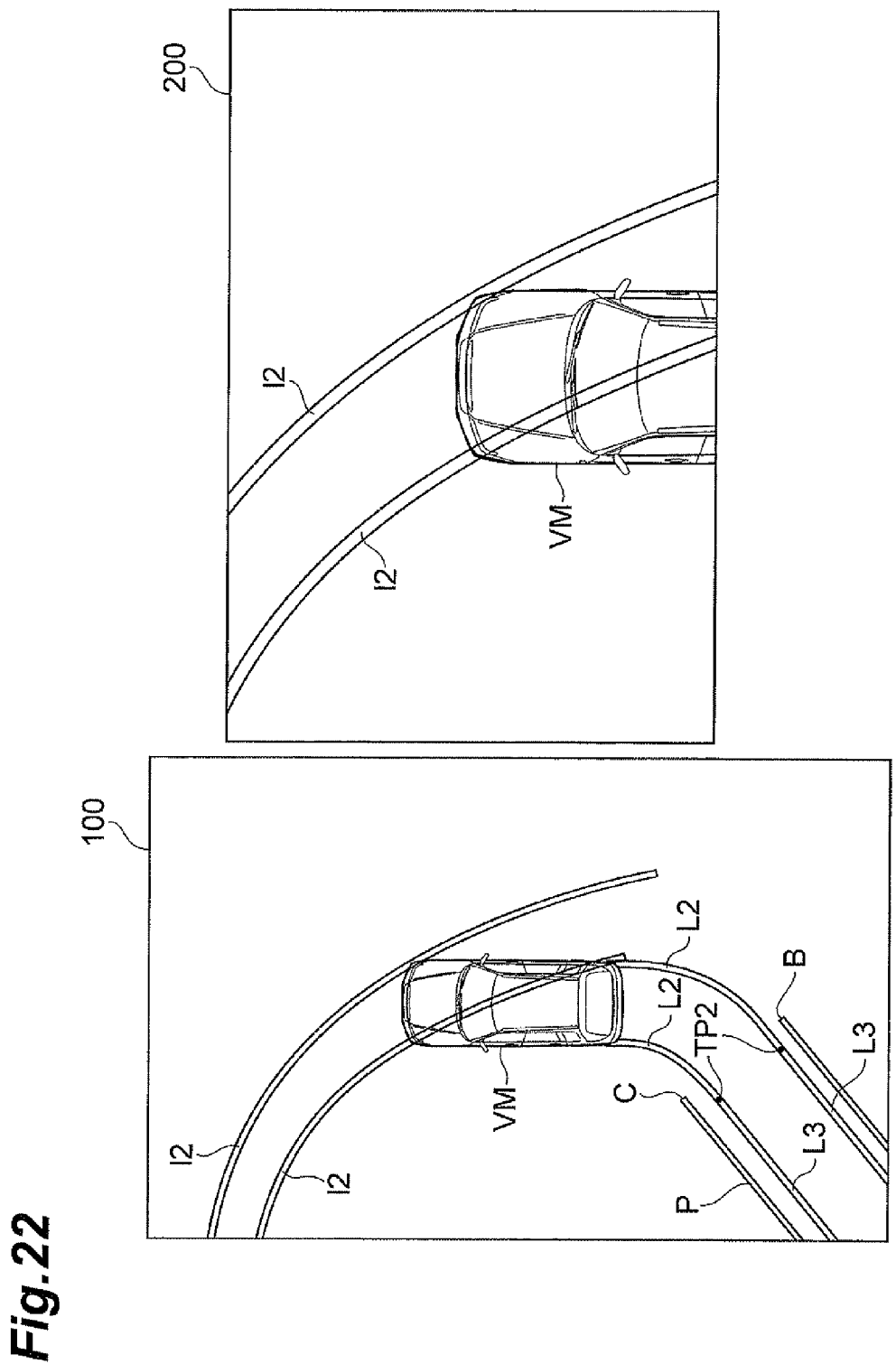
FIG. 22 is a diagram illustrating the birds-eye image and the front bird's-eye image which are actually displayed on the display of the parking assistance device according to the embodiment at the time T4 shown in FIG. 13.
Figure 23:
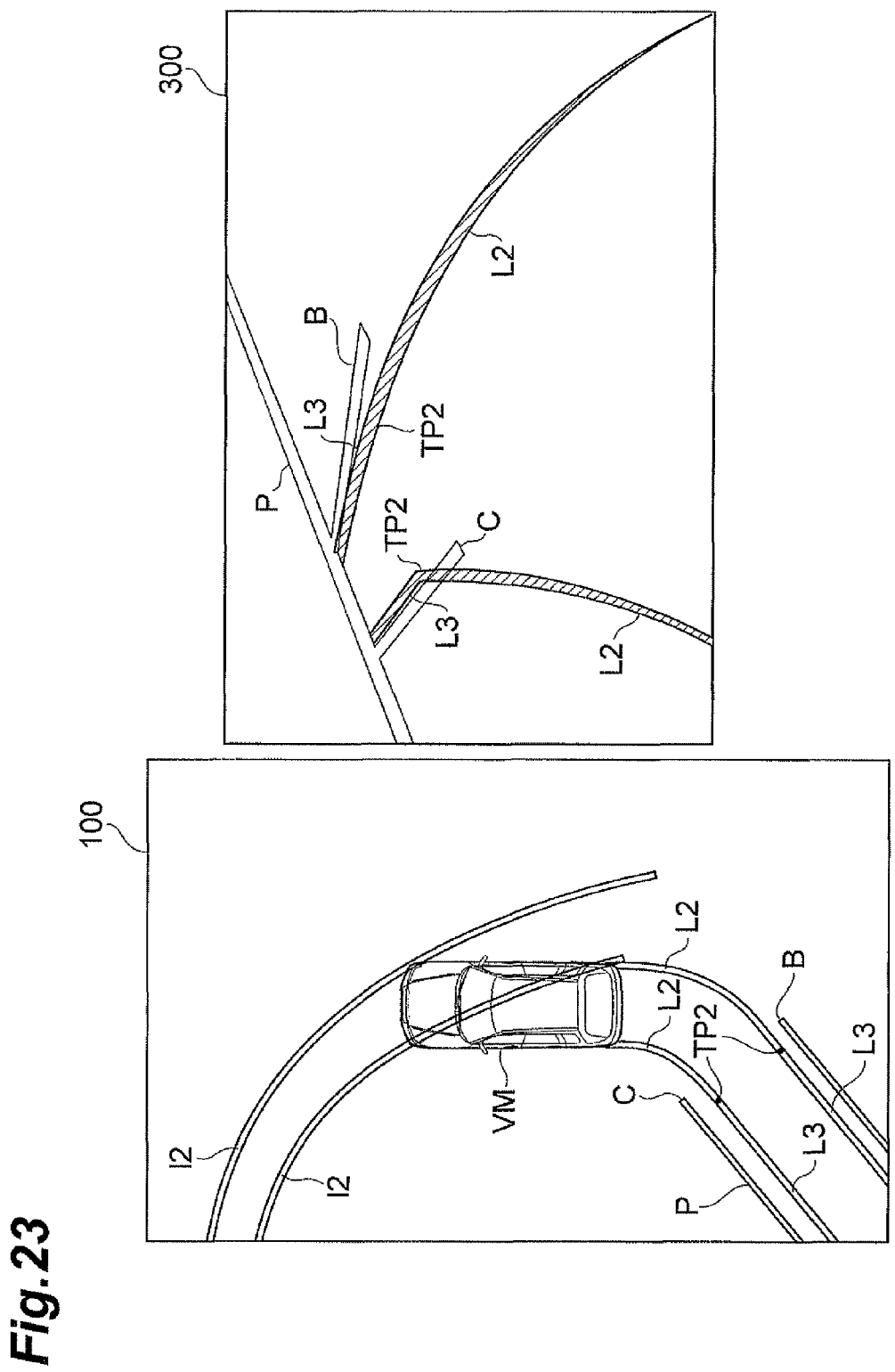
FIG. 23 is a diagram illustrating the bird's-eye image and the rear image which are actually displayed on the display of the parking assistance device according to the embodiment at the time T4 shown in FIG. 13.

At the time T3, the driver who views the parking area P and the trajectory ranges Z and z on the display 31 determines that the host vehicle VM reaches the reverse start position and stops the host vehicle VM. The driver steers the host vehicle VM at a constant steering angle capable of parking the host vehicle VM into the parking area P on the basis of the trajectory ranges Z and z and reverses the host vehicle VM. At a time T4 when the host vehicle VM starts to be reversed, as shown in FIGS. 22 and 23, the drawing arithmetic unit 21 displays only one kind of trajectories L2, l2, and L3 obtained by the steering angle which is detected by the steering angle sensor 12 of the host vehicle VM. When the steering angle is changed, the trajectories L2, l2, and L3 are also changed and then displayed on the display 31.

Figure 24:
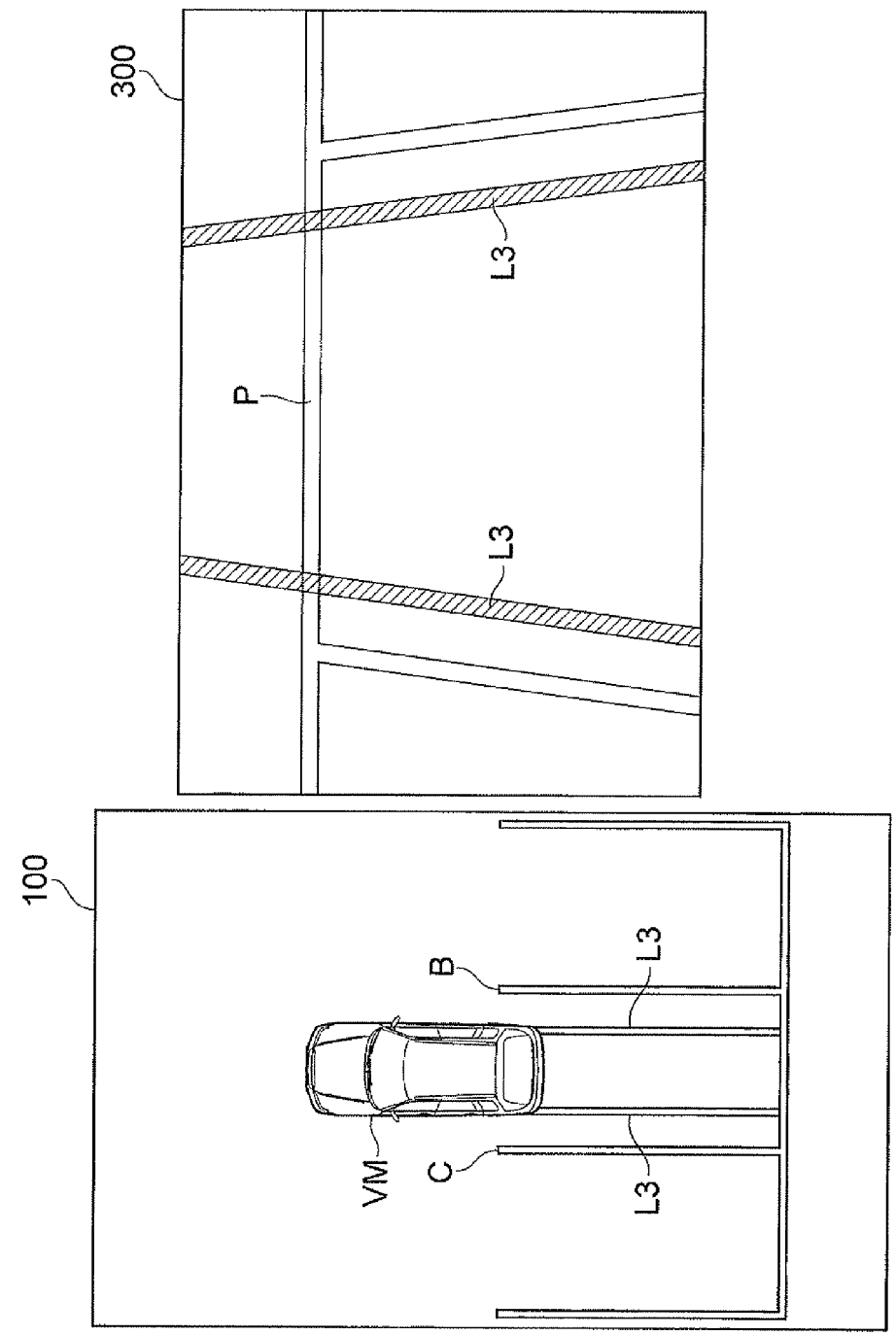
FIG. 24 is a diagram illustrating the bird's-eye image and the rear image which are actually displayed on the display of the parking assistance device according to the embodiment at the time T5 shown in FIG. 13.

At a time T5 when the host vehicle VM reaches the turning point TP2, as shown in FIG. 24, the driver reverses the host vehicle VM while adjusting the steering angle to 0°. The drawing arithmetic unit 21 displays only the trajectory L3 on the birds-eye image 100 and the rear image 300.

According to this embodiment, when the host vehicle VM moves forward, the drawing arithmetic unit 21 and the display 31 of the ECU 20 which display the image of the surroundings of the host vehicle VM display the trajectory L1 when the host vehicle VM moves forward from the current position at the current steering angle and the trajectories L2 and l2 when the host vehicle VM is reversed from the current position at a steering angle different from the current steering angle so as to be superimposed on the bird's-eye image 100. Therefore, for example, when the host vehicle VM moves forward while turning and then is reversed while turning in the reverse direction to be parked in the parking area P, the driver of the host vehicle VM can check the trajectory of the host vehicle VM during forward movement and the trajectory of the host vehicle VM during reverse at the same time. Therefore, it is easy for the driver of the host vehicle VM to drive the host vehicle VM forward to the reverse start position where the host vehicle VM does not contact a neighboring obstacle during reverse. As a result, it is possible to perform appropriate parking assistance when the host vehicle VM approaches obstacles.

In this embodiment, when the host vehicle VM moves forward, the drawing arithmetic unit 21 and the display 31 display the trajectory L1 and the ranges Z and z of the trajectories L2 and l2 obtained when the host vehicle is reversed from the current position at each steering angle in a predetermined range different from the current steering angle so as to be superimposed on the bird's-eye image 100. Therefore, the driver of the host vehicle VM has a high degree of flexibility in selecting the reverse start position during forward movement.

That is, only in the arc with a constant turning radius, during forward movement along the trajectory L1 along which the vehicle can freely travel, the parking area P overlaps the trajectories L2 and L3 at one point and the vehicle passes through a stop position for reverse start, which makes it difficult to stop the vehicle at that point. In contrast, in this embodiment, since there is flexibility in stop position candidates to which the vehicle is guided, it is possible to easily stop the host vehicle VM at the reverse start position. Therefore, even when there is an obstacle around the host vehicle VM or the parking area P, it is possible to easily perform a parking operation since there is a high degree of flexibility in the driving operation.

In this embodiment, when the host vehicle VM is reversed after the trajectories L1, L2, l2, and L3 and the ranges Z and z are displayed during the forward movement of the host vehicle VM, the drawing arithmetic unit 21 and the display 31 display the trajectories L2, l2, and L3 obtained when the host vehicle VM is reversed at a steering angle so as to be superimposed on the bird's-eye image 100. Therefore, the driver of the host vehicle VM determines the reverse start position on the basis of the trajectories L1, L2, l2, and L3 and the ranges Z and z during forward movement and parks the host vehicle VM in the parking area P with ease on the basis of the trajectories L2, l2, and L3 when starting to reverse the vehicle.

That is, the drawing arithmetic unit 21 and the display 31 display one kind of trajectories L2, l2, and L3 of the host vehicle VM corresponding to the steering angle of the host vehicle VM when the host vehicle VM is reversed. Therefore, it is easy for the driver to intuitively know the trajectory of the host vehicle VM corresponding to the steering angle of the host vehicle VM when the host vehicle VM is reversed. In particular, the ranges Z and z of the trajectory of the host vehicle VM when the host vehicle VM is reversed from the current position are displayed during forward movement or stop. In this case, it is possible to absorb movement caused by the ranges Z and z and it is easy to accurately park the host vehicle VM in the parking area P.

According to this embodiment, the range z is the range of the trajectory of the front end of the host vehicle VM obtained when the host vehicle VM is reversed from the current position at each steering angle in a predetermined range different from the current steering angle during the forward movement of the host vehicle VM. Therefore, the driver of the host vehicle VM has a high degree of flexibility in selecting the reverse start position during forward movement and it is easy for the driver to check the possibility that the front end, which is likely to contact obstacles and to be treated with disregard when movement changes from forward movement to reverse, will contact the obstacles.

According to this embodiment, the drawing arithmetic unit 21 and the display 31 can display the trajectories L1, L2, l2, and L3 so as to be superimposed on the front bird's-eye image 200 when the host vehicle VM moves forward. Therefore, for example, when the host vehicle VM moves forward while turning and is then reversed while turning in the reverse direction to be parked in the parking area P, it is easy for the driver of the host vehicle VM to check an obstacle which is likely to contact the front portion of the host vehicle VM when the host vehicle VM moves forward and is then reversed.

According to this embodiment, the drawing arithmetic unit 21 and the display 31 can display the trajectories L1, L2, l2, and L3 so as to be superimposed on the bird's-eye image 100 or the front bird's-eye image 200. Therefore, it is easy for the driver of the host vehicle VM to check the trajectory of the host vehicle VM and obstacles around the host vehicle VM when movement changes between forward movement and reverse.

The invention is not limited to the above-described embodiment, but various modifications and changes of the invention can be made without departing from the scope of the invention. For example, the above-described embodiment is focused on an aspect in which the host vehicle VM moves forward while turning and is then reversed while turning in the reverse direction to be parked in the parking area P.

INDUSTRIAL APPLICABILITY

According to the parking assistance device of an embodiment of the invention, it is possible to perform appropriate parking assistance when the host vehicle approaches obstacles.

REFERENCE SIGNS LIST

10: PARKING ASSISTANCE DEVICE
11: ASSISTANCE SWITCH
12: STEERING ANGLE SENSOR
13: YAW RATE SENSOR
14: VEHICLE SPEED SENSOR
15: TRANSMISSION SHIFT POSITION SENSOR
16: GPS
18: LASER RADAR
19: SONAR
20: ECU
21: DRAWING ARITHMETIC UNIT
22: DATABASE
23: TRAVELING CONTROL UNIT
30: IMAGE SWITCH
31: DISPLAY
32: SPEAKER
41: ACCELERATOR ACTUATOR
42: BRAKE ACTUATOR
43: STEERING ACTUATOR
51: FRONT CAMERA
52: REAR CAMERA
53: LEFT AND RIGHT CAMERAS
100: BIRD'S-EYE IMAGE
200: FRONT BIRD'S-EYE IMAGE
300: REAR IMAGE

The invention claimed is:

1. A parking assistance device comprising:
a display unit that displays an image of the surroundings of a host vehicle,
wherein, in response to the host vehicle moving forward, the display unit displays
(I) a first predicted trajectory of a front end of the host vehicle to be followed when the host vehicle moves forward from a current position at a current steering angle, and
(II) a range of a second predicted trajectory of the front end of the host vehicle to be followed when the host vehicle is reversed from the current position, boundaries of the range being defined by (i) a first potential second trajectory followed when the host vehicle is reversed from the current position at a first steering angle in the reverse direction from the current steering angle, and (ii) a second potential second trajectory followed when the host vehicle is reversed from the current position at a second steering angle in the reverse direction from the current steering angle,
the first predicted trajectory and the range of the second predicted trajectory being superimposed on the image of the surroundings of the host vehicle, the second steering angle being different from the first steering angle,
the display unit simultaneously displaying the first predicted trajectory of the front end of the host vehicle moving forward and the range of the second predicted trajectory of the front end of the host vehicle being reversed.

2. The parking assistance device according to claim 1, wherein,
when the host vehicle is reversed after the first predicted trajectory and the range of the second predicted trajectory are displayed during the forward movement of the host vehicle, the display unit displays a third predicted trajectory of the front end of the host vehicle followed when the host vehicle is reversed at a steering angle so as to be superimposed on the image of the surroundings of the host vehicle.

3. The parking assistance device according to claim 1, wherein
the display unit displays the first predicted trajectory and the range of the second predicted trajectory so as to be superimposed on an image of a front portion of the host vehicle.

4. The parking assistance device according to claim 2, wherein
the display unit displays the first predicted trajectory and the range of the second predicted trajectory so as to be superimposed on an image of a front portion of the host vehicle.

5. The parking assistance device according to claim 1, wherein
the display unit displays the first predicted trajectory and the range of the second predicted trajectory so as to be superimposed on a bird's-eye image of the host vehicle.

6. The parking assistance device according to claim 2, wherein
the display unit displays the first predicted trajectory and the range of the second predicted trajectory so as to be superimposed on a bird's-eye image of the host vehicle.

7. The parking assistance device according to claim 3, wherein
the display unit displays the first predicted trajectory and the range of the second predicted trajectory so as to be superimposed on a bird's-eye image of the host vehicle.

8. The parking assistance device according to claim 4, wherein
the display unit displays the first predicted trajectory and the range of the second predicted trajectory so as to be superimposed on a bird's-eye image of the host vehicle.

9. The parking assistance device according to claim 1, wherein,
the display unit displays the first potential second trajectory from the current position to a terminal position of the first potential second trajectory beyond which the display unit does not display the first potential second trajectory, and the display unit displays the second potential second trajectory from the current position to a terminal position of the second potential second trajectory beyond which the display unit does not display the second potential second trajectory, the terminal position of the first potential second trajectory being different from the terminal position of the second potential second trajectory.

* * * * *